(12) United States Patent
Hashimoto

(10) Patent No.: US 7,459,830 B2
(45) Date of Patent: Dec. 2, 2008

(54) PIEZOELECTRIC ACTUATOR, DRIVE CONTROL METHOD OF PIEZOELECTRIC ACTUATOR, AND ELECTRONIC DEVICE

(75) Inventor: Yasuharu Hashimoto, Minami-Minowa (JP)

(73) Assignee: Seiko Epson Corporation (JP)

( * ) Notice: Subject to any disclaimer, the term of this patent is extended or adjusted under 35 U.S.C. 154(b) by 123 days.

(21) Appl. No.: 11/706,049

(22) Filed: Feb. 13, 2007

(65) Prior Publication Data

US 2007/0194660 A1 Aug. 23, 2007

(30) Foreign Application Priority Data

Feb. 17, 2006 (JP) ............... 2006-040210

(51) Int. Cl.
*H01L 41/08* (2006.01)
(52) U.S. Cl. .................... 310/316.01; 310/316.02; 310/323.02; 310/369
(58) Field of Classification Search ........... 310/369, 310/323.02, 316.01, 316.02
See application file for complete search history.

(56) References Cited

U.S. PATENT DOCUMENTS

| | | | | |
|---|---|---|---|---|
| 5,214,339 | A | * 5/1993 | Naito ............... | 310/316.02 |
| 6,051,911 | A | * 4/2000 | Kojima et al. ......... | 310/366 |
| 6,072,266 | A | * 6/2000 | Tomikawa ........... | 310/323.02 |
| 7,005,776 | B1 | 2/2006 | Iino et al. | |

FOREIGN PATENT DOCUMENTS

| | | |
|---|---|---|
| JP | 2000-004590 | 1/2000 |
| JP | 2004-166324 | 6/2004 |
| JP | 2005-086884 | 3/2005 |
| JP | 2005-086991 | 3/2005 |

* cited by examiner

*Primary Examiner*—Mark Budd
(74) *Attorney, Agent, or Firm*—Harness, Dickey & Pierce, P.L.C.

(57) ABSTRACT

A piezoelectric actuator includes: a ring-shaped piezoelectric element, vibration of the piezoelectric element being transmitted to an object; a first vibration area and a second vibration area provided on both sides of a bisector bisecting the piezoelectric element along a diameter of the piezoelectric element, the first vibration area and the second vibration area being respectively provided with at least one drive electrode to which a drive signal is supplied, the drive electrode being arranged substantially axisymmetrically with respect to the bisector, the drive signal including a phase-advance drive signal and a phase-delay drive signal having a predetermined drive phase difference, the phase-advance drive signal that is phase-advanced relative to the phase-delay drive signal being supplied to one of the first vibration area and the second vibration area and the phase-delay drive signal that is phase-delayed relative to the phase-advance drive signal being supplied to the other of the first vibration area and the second vibration area; and a detection electrode that detects vibrating condition of the piezoelectric element to output a vibration signal, the detection electrode being provided on at least one of the first vibration area and the second vibration area to which the phase-delay drive signal is supplied, the drive of the piezoelectric actuator being controlled based on a detected phase difference between one of the phase-advance drive signal and the phase-delay drive signal and the vibration signal.

9 Claims, 14 Drawing Sheets

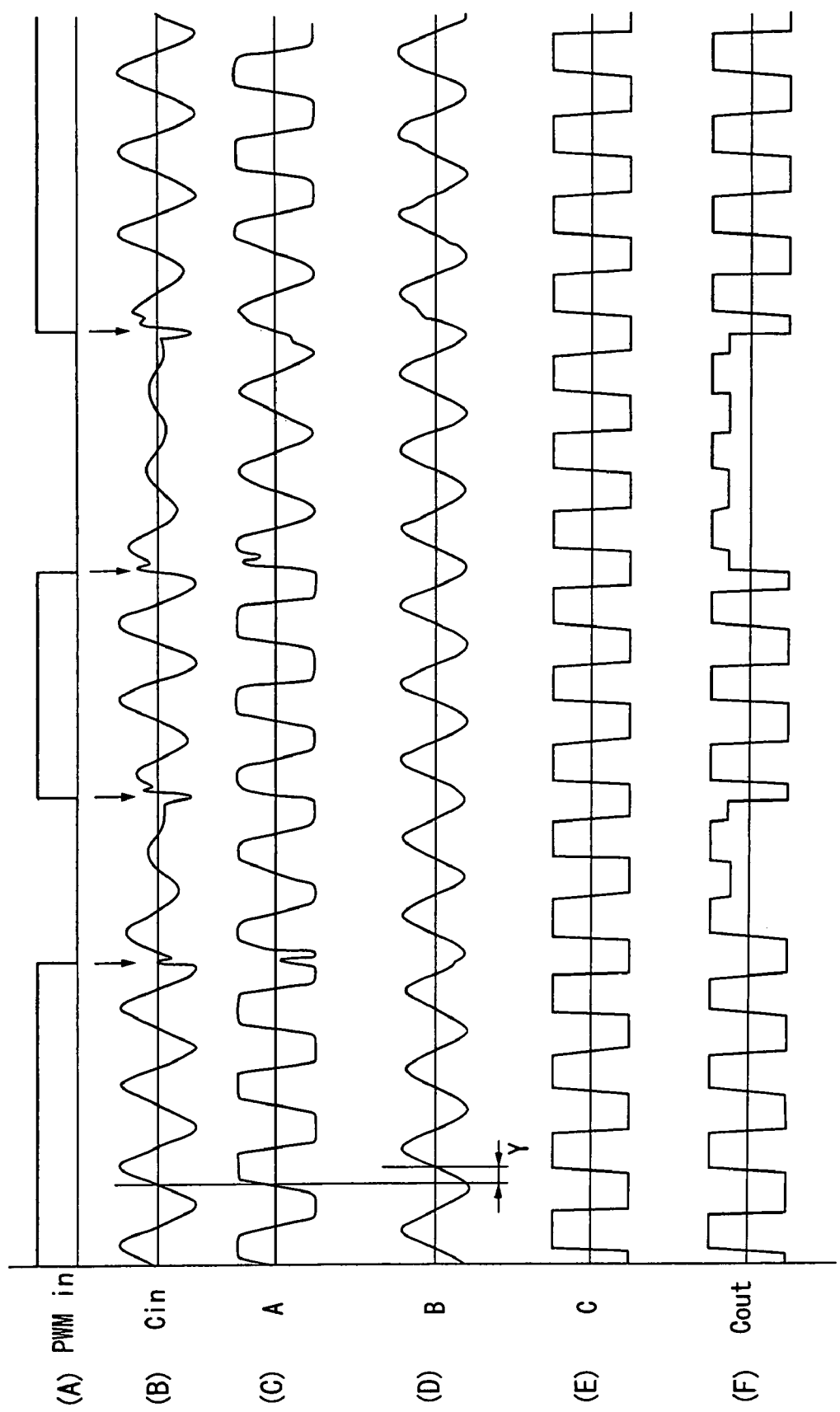

PIEZOELECTRIC ACTUATOR, DRIVE CONTROL METHOD OF PIEZOELECTRIC ACTUATOR, AND ELECTRONIC DEVICE

The entire disclosure of Japanese Patent Application No. 2006-40210, filed Feb. 17, 2006, is expressly incorporated by reference herein.

BACKGROUND

1. Technical Field

The invention relates to a piezoelectric actuator, a drive control method of piezoelectric actuator, and an electronic device 2. Related Art In view of excellent conversion efficiency from electric energy to mechanical energy and high responsivity of piezoelectric element, a piezoelectric actuator that drives an object by transmitting a vibration of a piezoelectric element has been recently developed.

One of known piezoelectric actuators employs a ring piezoelectric element (Document 1: Japanese Patent Laid-Open Publication No. 2005-86884). Since such piezoelectric actuator has greater electromechanical coupling coefficient of piezoelectric element than a piezoelectric element of a shape having longitudinal direction (e.g. rectangle), large output can be obtained for the dimension thereof.

In order to drive the piezoelectric actuator, drive electrodes are provided on both sides of a bisector along the diameter of the piezoelectric element, and drive signal is supplied to the drive electrodes by a predetermined phase difference to resonate the piezoelectric actuator. At this time, respiratory vibration (each area provided with each drive electrode reciprocates from inside to outside and from outside to inside along radial direction of the piezoelectric element) and bending vibration (the areas on both sides of the bisector are eccentrically oscillated in a direction orthogonal to the bisector on account of the phase difference between the respiratory vibrations of the respective areas) are excited on the piezoelectric actuator.

Since the related-art ring-shaped piezoelectric actuator as shown in Document 1 is driven without detecting the vibration generated on the piezoelectric actuator, resonation cannot be accurately recognized and efficient drive of the actuator have been difficult. Accordingly, it is conceivable that a detection electrode for detecting the vibration is provided on the piezoelectric element and the drive frequency is controlled based on the detected vibrating condition. In controlling the drive frequency, drive action may be unstabilized when the drive frequency is directly changed, so the phase difference of the vibration signal relative to the drive signal is fed back to alter the drive frequency in a tracking manner. In other words, the phase difference of the vibration signal relative to the drive signal is an index for controlling the drive of the actuator, and the drive control becomes difficult if the phase difference is not monotonic increase or decrease because the direction for increasing or decreasing the drive frequency cannot be determined. However, the phase difference may not exhibit monotonic increase or decrease according to the position of the detection electrode. Because of such difficulties, related-art ring-shaped piezoelectric actuator has no detection electrode. Accordingly, since the drive frequency is not appropriately controlled, the piezoelectric actuator may be excessively excited to cause damage on the actuator.

SUMMARY

In view of the above deficiencies, an object of the invention is to provide a piezoelectric actuator capable of easy drive control, a drive control method of a piezoelectric actuator and an electronic device.

A piezoelectric actuator according to an aspect of the invention includes: a ring-shaped piezoelectric element, vibration of the piezoelectric element being transmitted to an object; a first vibration area and a second vibration area provided on both sides of a bisector bisecting the piezoelectric element along a diameter of the piezoelectric element, the first vibration area and the second vibration area being respectively provided with at least one drive electrode to which a drive signal is supplied, the drive electrode being arranged substantially axisymmetrically with respect to the bisector, the drive signal including a phase-advance drive signal and a phase-delay drive signal having a predetermined drive phase difference, the phase-advance drive signal that is phase-advanced relative to the phase-delay drive signal being supplied to one of the first vibration area and the second vibration area and the phase-delay drive signal that is phase-delayed relative to the phase-advance drive signal being supplied to the other of the first vibration area and the second vibration area; and a detection electrode that detects vibrating condition of the piezoelectric element to output a vibration signal, the detection electrode being provided on at least one of the first vibration area and the second vibration area to which the phase-delay drive signal is supplied, the drive of the piezoelectric actuator being controlled based on a detected phase difference between one of the phase-advance drive signal and the phase-delay drive signal and the vibration signal.

A drive control method according to another aspect of the invention is for a piezoelectric actuator, the piezoelectric actuator including: a ring-shaped piezoelectric element; a first vibration area and a second vibration area provided on both sides of a bisector bisecting the piezoelectric element along a diameter of the piezoelectric element, the first vibration area and the second vibration area being respectively provided with at least one drive electrode to which a drive signal is supplied, the drive electrode being arranged substantially axisymmetrically with respect to the bisector; and a detection electrode that detects vibrating condition of the piezoelectric element to output a vibration signal, the detection electrode being provided on at least one of the first vibration area and the second vibration area, the method comprising: providing the drive signal with a phase-advance drive signal and a phase-delay drive signal having a predetermined phase difference, the phase-advance drive signal that is phase-advanced relative to the phase-delay drive signal being supplied to one of the first vibration area and the second vibration area and the phase-delay drive signal that is phase-delayed relative to the phase-advance drive signal being supplied to the other of the first vibration area and the second vibration area; and variably controlling the frequency of the drive signal based on a detected phase difference between one of the phase-advance drive signal and the phase-delay drive signal and the vibration signal.

In the ring-shaped piezoelectric actuator, drive signals having a predetermined drive phase difference are respectively supplied into the first and the second vibration areas to excite a respiratory vibration (expansion and contraction of each of the first and the second vibration areas in radial direction of the piezoelectric element) and a bending vibration (areas on both sides of the bisector are eccentrically moved in a direction orthogonal to the bisector on account of phase difference between the first and the second vibration areas). Since a part of the piezoelectric actuator moves in an ellipsoidal locus, an object disposed on the part of the piezoelectric actuator can be highly efficiently driven in a direction in which the object is in contact with the ellipsoidal locus. When the drive of the piezoelectric actuator is to be controlled based on the detected phase difference of the vibration signal relative to the drive signal, since the drive signal has a predetermined drive phase difference and the strain distribution of the piezoelectric element is asymmetry with respect to the bisector, it is difficult to determine on which part of the piezoelectric element the detection electrode is to be located.

The Applicant of the present application has conducted vigorous research on the relationship between the drive phase difference (90° for instance) and the location of the detection electrode. As a result, it has been found that monotonic increase or decrease of the detected phase difference can be achieved within a range exhibiting good drive efficiency by providing the detection electrode on the vibration area on which the phase-delay drive signal is supplied.

In other words, the characteristics of the phase difference between the vibration signal and the drive signal can be set either monotonic increase or monotonic decrease by the above arrangement, so that the frequency of the drive signal can be easily controlled based on the detected phase difference without requiring complicated algorithm. Fluctuation of resonance point on account of change in ambient temperature, heat-generation due to continuous drive and temporal change due to friction against the object to be driven can be compensated by controlling the frequency of the drive signal, so that the object can be stably driven.

Further, since the frequency of the drive signal can be defined solely by the detected phase difference between the vibration signal and the drive signal, the structure of the drive circuit can be simplified, thereby achieving reduction in cost and malfunction rate, reliability can be improved.

Incidentally, a plurality of drive electrodes may be provided on the first and the second vibration areas.

In the piezoelectric actuator of the above aspect of the invention, it is preferable that plus and minus of the drive phase difference are switchably arranged, and the detection electrode is provided on both of the first vibration area and the second vibration area substantially axisymmetrically with respect to the bisector or substantially point-symmetrically with respect to the circle center of the piezoelectric element.

Further, in the drive control method of a piezoelectric actuator according to the another aspect of the invention, it is preferable that plus and minus of the drive phase difference are switchably arranged, the detection electrode is provided on both of the first vibration area and the second vibration area substantially axisymmetrically with respect to the bisector or substantially point-symmetrically with respect to the circle center of the piezoelectric element, and the detection electrode provided on one of the first vibration area and the second vibration area to which the phase-delay drive signal is supplied is used in accordance with switching of the plus and minus of the drive phase difference.

By switching plus and minus of the drive phase difference of the drive signals respectively supplied to the first and the second vibration areas, the vibrating action of the piezoelectric actuator is switched substantially axisymmetrically with respect to the bisector, and the object is driven in normal and reverse direction. When plus and minus of the phase difference between the two-phase drive signals are switched, though the phase-advance drive signal and phase-delay drive signal are switched with each other, the detection electrode provided on one of the first and the second vibration areas to which the phase-delay drive signal is supplied is used as mentioned above.

As described above, since the drive signal has a predetermined drive phase difference and the strain distribution of the piezoelectric element is asymmetric with respect to the bisector, it is difficult to detect the vibrating condition when plus and minus of the drive phase difference is switched if the detection electrode is provided on only one of the first and the second vibration areas. However, in the invention, the drive can be properly controlled using one of the detection electrodes even when plus and minus of the drive phase difference are switched.

Further, since the respective detection electrodes are symmetrically provided and the strain can be detected irrespective of plus and minus of the drive phase difference, the drive performance of plus drive phase difference and minus drive phase difference can be made substantially equal by controlling the frequency of drive signal based on the detected phase difference.

In the piezoelectric actuator of the invention, the detection electrode may preferably be formed in a shape extending along a circumference of the piezoelectric element.

According to the above arrangement, since the detection electrode is formed in a shape extending along a circumference of the piezoelectric element, not only the respiratory vibration mode (stretching in radial direction of the piezoelectric element) but also eccentric mode (eccentric movement of the first and the second vibration areas in a direction orthogonal to the bisector on account of the phase difference of the respiratory vibration) can be detected by the respective detection electrode as passive strain at the portion where the detection electrode is provided. In other words, since the circle center of the piezoelectric element reciprocates in a direction orthogonal to the bisector during the eccentric mode and the detection electrode extends along the circumferential direction, approaching of the outer circumference toward the inner circumference can be detected by one of the first and the second vibration areas and approaching of the inner circumference toward the outer circumference can be detected by the other of the first and the second vibration areas, thereby detecting displacement in the eccentric mode. Both of the vibration of respiratory vibration and eccentricity can be detected, based on which the frequency of the drive signal can be properly controlled. Further, since the strain on account of the eccentricity and the strain generated by the respiratory vibration is generated are superposed on the portion on which the detection electrodes are provided, the voltage of the vibration signals can be set large, so that the vibration can be clearly detected The width of the detection electrode in radial direction of the piezoelectric elements is preferably smaller than the length of the detection element along the bisector. Accordingly, the smaller displacement on account of eccentricity than that of the respiratory vibration can be clearly detected, so that drive control in accordance with detected phase difference can be properly conducted.

In the piezoelectric actuator of the invention, the detection electrode may preferably be formed along a periphery of a hole formed substantially at the center of the piezoelectric element.

According to the above arrangement, the detection electrode is disposed on a periphery of the hole or the ring-shaped piezoelectric element, i.e. on the inner circumference of the piezoelectric element, and the drive electrode is disposed on the outer circumference (anti-node of vibration) of the piezoelectric element to allow active displacement of the portion on which the drive electrode is provided. Accordingly, deterioration of output of the piezoelectric actuator on account of provision of the detection electrodes can be avoided.

Further, the detection electrode and the detection electrode are provided by dividing an electrode formed by plating, sputtering and vapor evaporation on the surface of the piezoelectric element with an etching groove and the like. When the drive electrode and the detection electrode are divided by one etching groove formed along the circumference of the piezoelectric element, provision of the detection electrode on the outer circumference requires larger area than an arrangement where the detection electrode is disposed on the inner circumference, which results in corresponding reduction of the area of the drive electrode. Since such arrangement is not beneficial in terms of output, the detection electrode is preferably provided on the inner circumference of the piezoelectric element.

The piezoelectric actuator according to the above aspect of the invention may preferably include a ring-shaped vibrating member having the piezoelectric element; and a pair of supporting member connected to the vibrating member, the pair of supporting members supporting the vibrating member in a vibratable manner, in which the supporting members may preferably be provided on an outer circumference of the vibrating member at a position substantially orthogonal to the bisector.

According to the above arrangement, since the vibrating members are supported substantially at the center of the circumference of the respective first and the second vibration areas, the vibration can be excited by the first and the second vibration areas in a balanced manner, so that attenuation of the vibration caused by supporting the vibrating member can be reduced to the minimum.

Incidentally, the vibrating section may be constructed by interposing a ring-shaped reinforcing plate between two piezoelectric elements, where the supporting member can be easily provided on the reinforcing plate by metal plate stamping and the like.

An electronic device according to further aspect of the present invention includes the above-described piezoelectric vibrator.

According to the above arrangement, since the above-described piezoelectric vibrator is provided, the same function and advantages as described above can be obtained. In other words, the characteristics of the phase difference suitable for drive control can be obtained to facilitate the drive control, so that production cost can be reduced and reliability can be improved.

The electronic device according to the above aspect of the present invention may preferably be a timepiece including a timer and a time information display that displays information clocked by the timer.

The piezoelectric actuator is installed as a drive section in the display device such as calendar and time (hour, minute and second). Since the piezoelectric actuator includes a ring-shaped piezoelectric element, great torque can be obtained and thick pointer and date dial can be driven, which enhances stateliness and expensive-looking of the timepiece. Further, since the stability of the timepiece can be enhanced by controlling the drive frequency, the piezoelectric actuator is preferably used in a wristwatch of which vibration characteristics are likely to be influenced by variation in the ambient temperature and attitude of the device.

The advantage of installing a piezoelectric actuator in a timepiece is that a piezoelectric actuator, as compared with a stepping motor and the like, is free from influence of magnetism, is highly responsive and adapted to minute feed, is advantageous for reduction in size and thickness and has high torque.

BRIEF DESCRIPTION OF THE DRAWINGS

The invention will be described with reference to the accompanying drawings, wherein like numbers reference like elements.

FIG. 7 is a waveform chart showing respective signal waveforms of the drive control circuit of FIG. 6;

Figure 1:
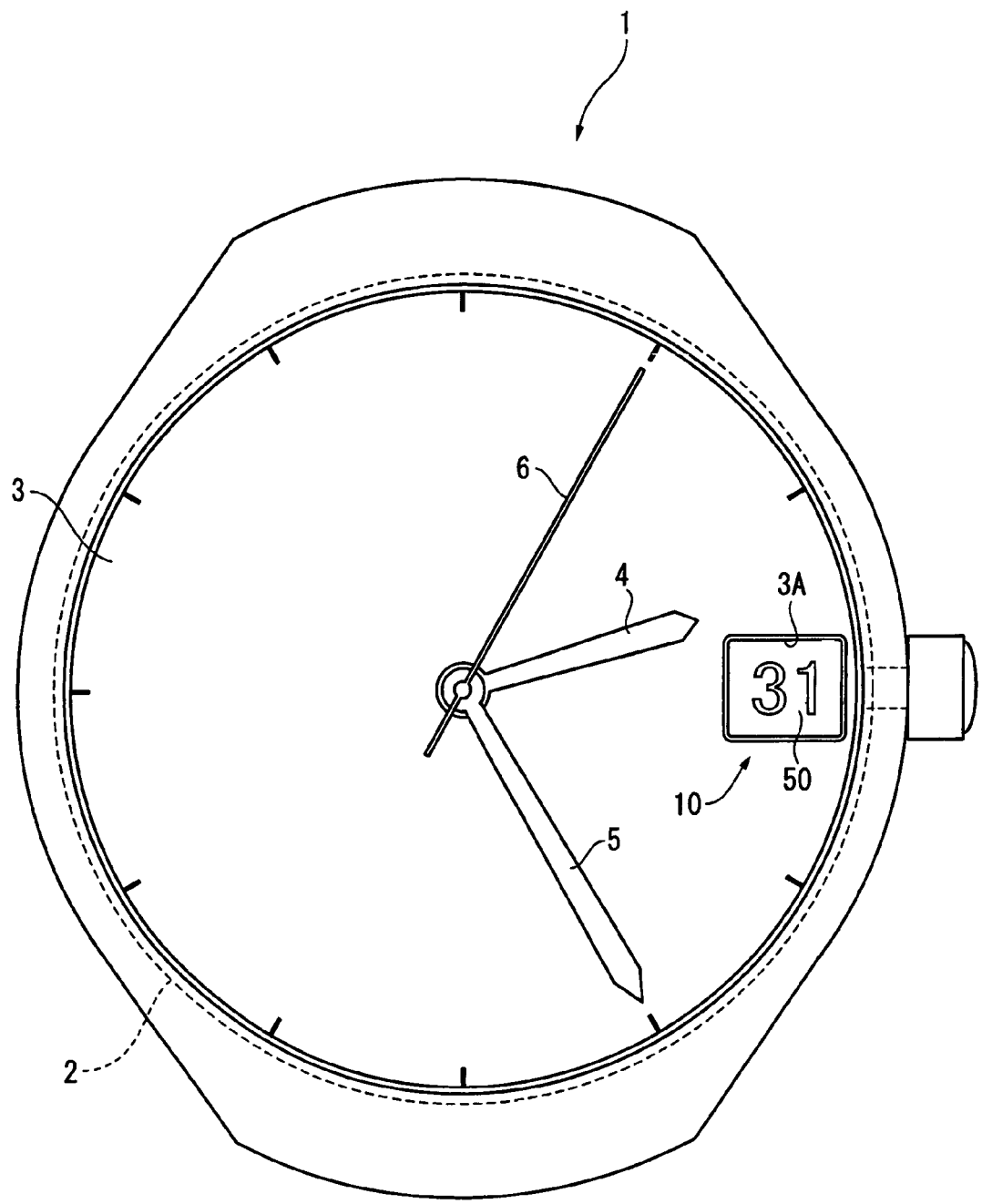
FIG. 1 shows an exterior of an electronic timepiece according to an exemplary embodiment of the invention.

DESCRIPTION OF EXEMPLARY
EMBODIMENT(S)

An exemplary embodiment of the invention will be described below with reference to the attached drawings.

Incidentally, the same reference numeral will be attached to the same components as those described above, whereby description thereof will be simplified or omitted.

1 Entire Arrangement

FIG. 1 shows an exterior of an electronic timepiece 1 according to an exemplary embodiment. The electronic timepiece 1 is a wristwatch including a movement 2 (clock), a time information display for displaying time which includes dial plate 3, hour hand 4, minute hand 5 and second hand 6, and a date display device 10 for displaying date through a window 3A provided on the dial plate 3.

2 Arrangement of Date Display Device

Figure 2:
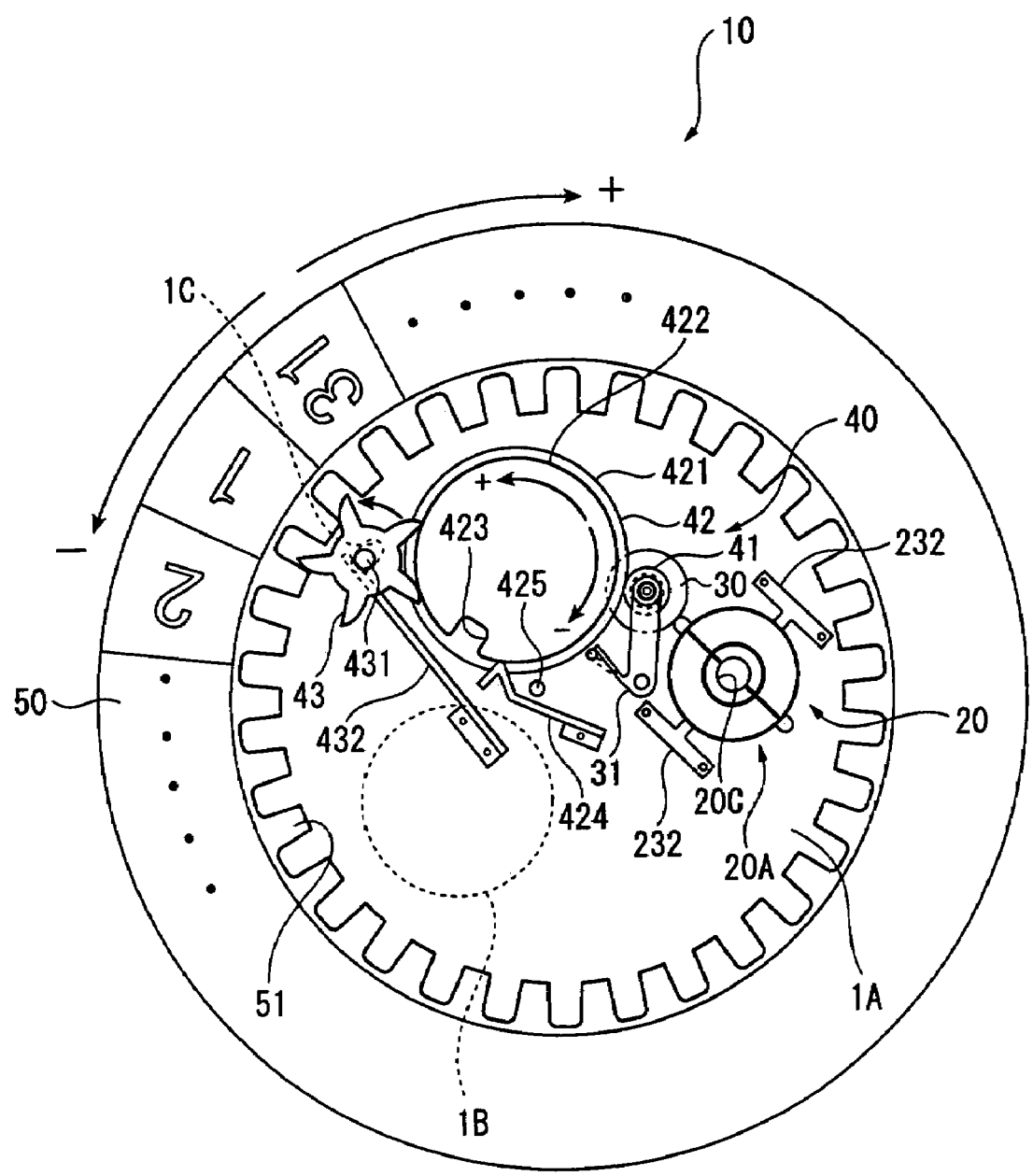
FIG. 2 is a plan view showing a date display device of the exemplary embodiment.

FIG. 2 is a plan view showing a date display device 10 supported by a bottom plate 1A. The date display device 10 includes a piezoelectric actuator 20, a rotor 30 (object to be driven) rotated by the piezoelectric actuator 20, a deceleration gear train 40 for decelerating and transmitting the rotation of the rotor 30, and a date dial 50 rotated by a drive force transmitted through the deceleration gear train 40.

The rotor 30 is rotated by the piezoelectric actuator 20 at the time of date change or date correction. A plate spring 31 is provided on the rotor 30, which biases the rotor 30 toward the piezoelectric actuator 20 to generate a predetermined friction force between the piezoelectric actuator 20 and the rotor 30, which enhances transmission efficiency of the vibration from the piezoelectric actuator 20 toward the rotor 30.

The deceleration gear train 40 includes a gear 41 disposed coaxially with and turned integrally with the rotor 30, a date driving intermediate dial 42 meshed with the gear 41, and a date driving dial 43.

Incidentally, a stepping motor (not shown) driven by a pulse signal generated by a crystal oscillator, a hand-driving gear train (not shown) connected to the stepping motor to drive the hour hand 4, minute hand 5 and second hand 6 and a battery 1B are provided on the lower (back) side of the bottom plate 1A. The battery 1B supplies power to respective circuits including the stepping motor, the piezoelectric actuator 20 and driving circuit (not shown) for applying alternate voltage to the piezoelectric actuator 20.

The date driving intermediate dial 42 includes a large-diameter part 421 and a small-diameter part 422. The small-diameter part 422 has a cylindrical shape a little smaller than the large-diameter part 421, which includes an approximately square notch 423 on the outer circumference thereof. The small-diameter part 422 is concentrically fixed on the large-diameter part 421. The gear 41 on the upper side of the rotor 30 is meshed with the large-diameter part 421, so that the date driving intermediate dial 42 is rotated in accordance with the rotation of the rotor 30.

A plate spring 424 is provided on the bottom plate IA provided on the lateral side of the date driving intermediate dial 42. A base end of the plate spring 424 is fixed on the bottom plate 1A and a distal end is bent in an approximately V-shape. The distal end of the plate spring 424 is adapted to go into and out of the notch 423 of the date driving intermediate dial 42. A contact piece 425 is located at a position adjacent to the plate spring 424, the contact piece 425 being in contact with the plate spring 424 when the date driving intermediate dial 42 is rotated and the distal end of the plate spring 424 enters into the notch 423. A predetermined voltage is applied on the plate spring 424 and the voltage is applied on the contact piece 425 when the plate spring 424 contacts the contact piece 425. Accordingly, date-forwarding condition can be detected by sensing the voltage of the contact piece 425, thereby detecting rotation amount of the date dial 50 per a day.

Incidentally, the rotation amount of the date dial 50 may not be detected by the plate spring 424 and the contact piece 425 but may be detected by a sensor for detecting rotary condition of the rotor 30 and the date driving intermediate dial 42 to output a predetermined pulse signal, which specifically may be various rotary encoder including known photo reflector, photo interrupter and MR sensor.

The date dial 50 has a ring-shape and an inner gear 51 is formed on the inner circumference thereof. The date driving gear 43 has a five-tooth gear, which meshes with the inner gear 51 of the date dial 50. Further, a shaft 431 is provided at the center of the date driving gear 43, the shaft 431 being loosely inserted into a through-hole 1C formed on the bottom plate 1A. The through-hole 1C is elongated along a circumferential direction of the date dial 50. The date driving dial 43 and the shaft 431 are biased toward upper right direction in FIG. 2 by the plate spring 432 fixed on the bottom plate 1A. The biasing of the plate spring 432 prevents shaky movement of the date dial 50.

3 Arrangement of Piezoelectric Actuator

Next, the piezoelectric actuator 20 will be described. The piezoelectric actuator 20 is actuated at the time of date change or date correction, to which two-phase drive signal of alternate voltage is supplied to drive the rotor 30. Incidentally, the rotor 30 and the piezoelectric actuator 20 are juxtaposed on a plane.

Figure 3:
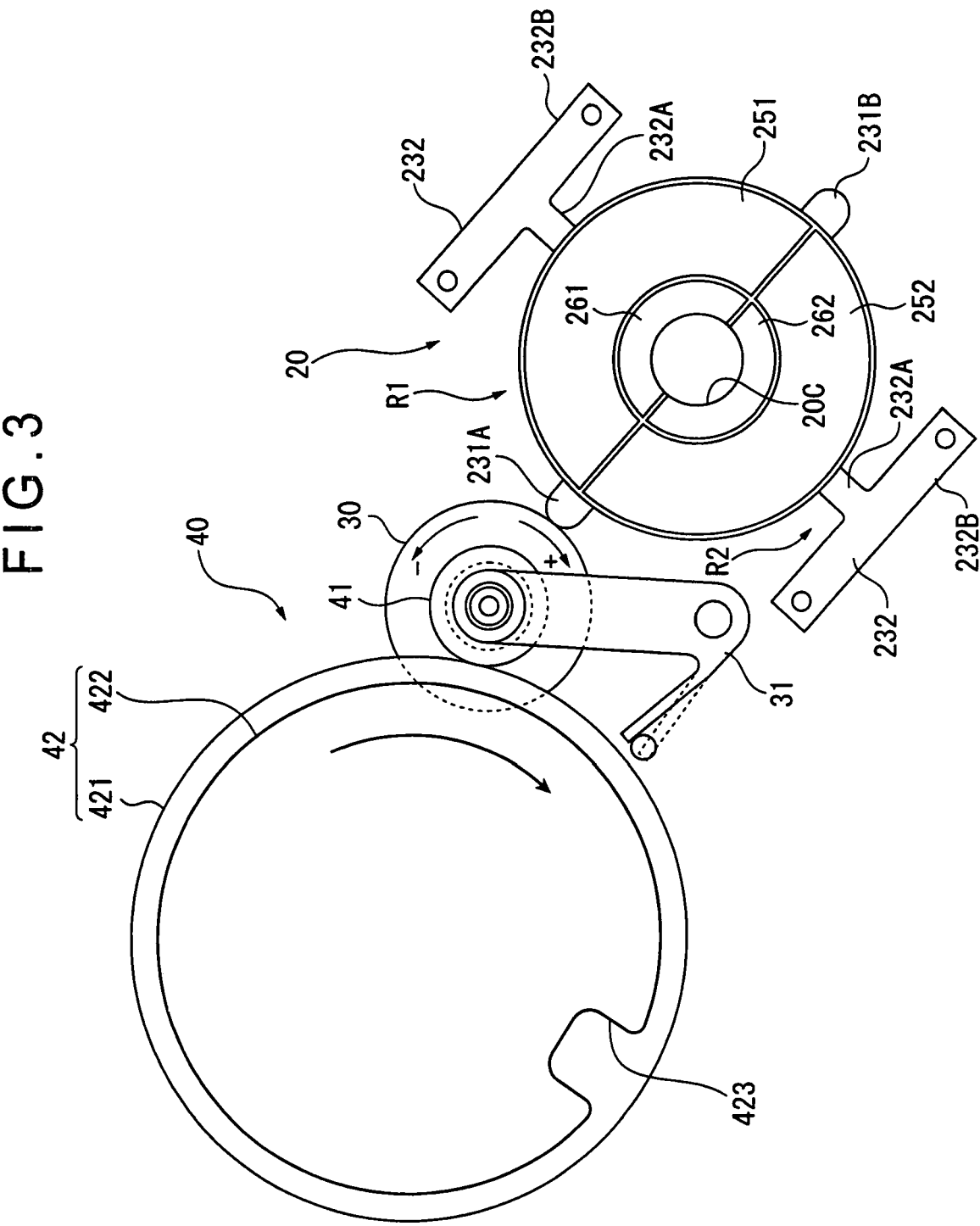
FIG. 3 is a partially enlarged illustration of FIG. 2.
Figure 4:
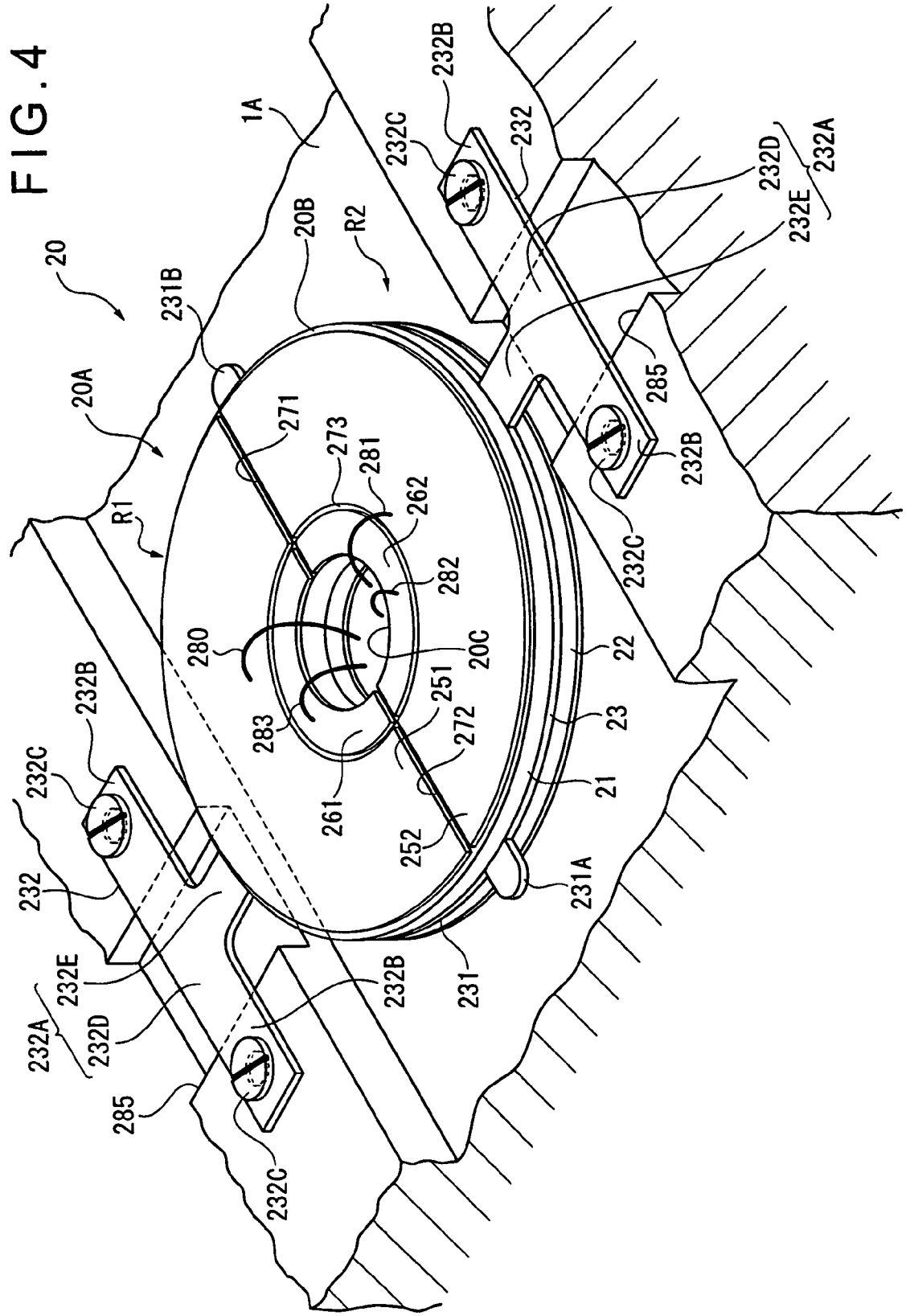
FIG. 4 is a perspective view showing a piezoelectric actuator of the exemplary embodiment.

FIG. 3 is a partially enlarged view of FIG. 3 and FIG. 4 is a perspective view of the piezoelectric actuator 20.

Figure 6:
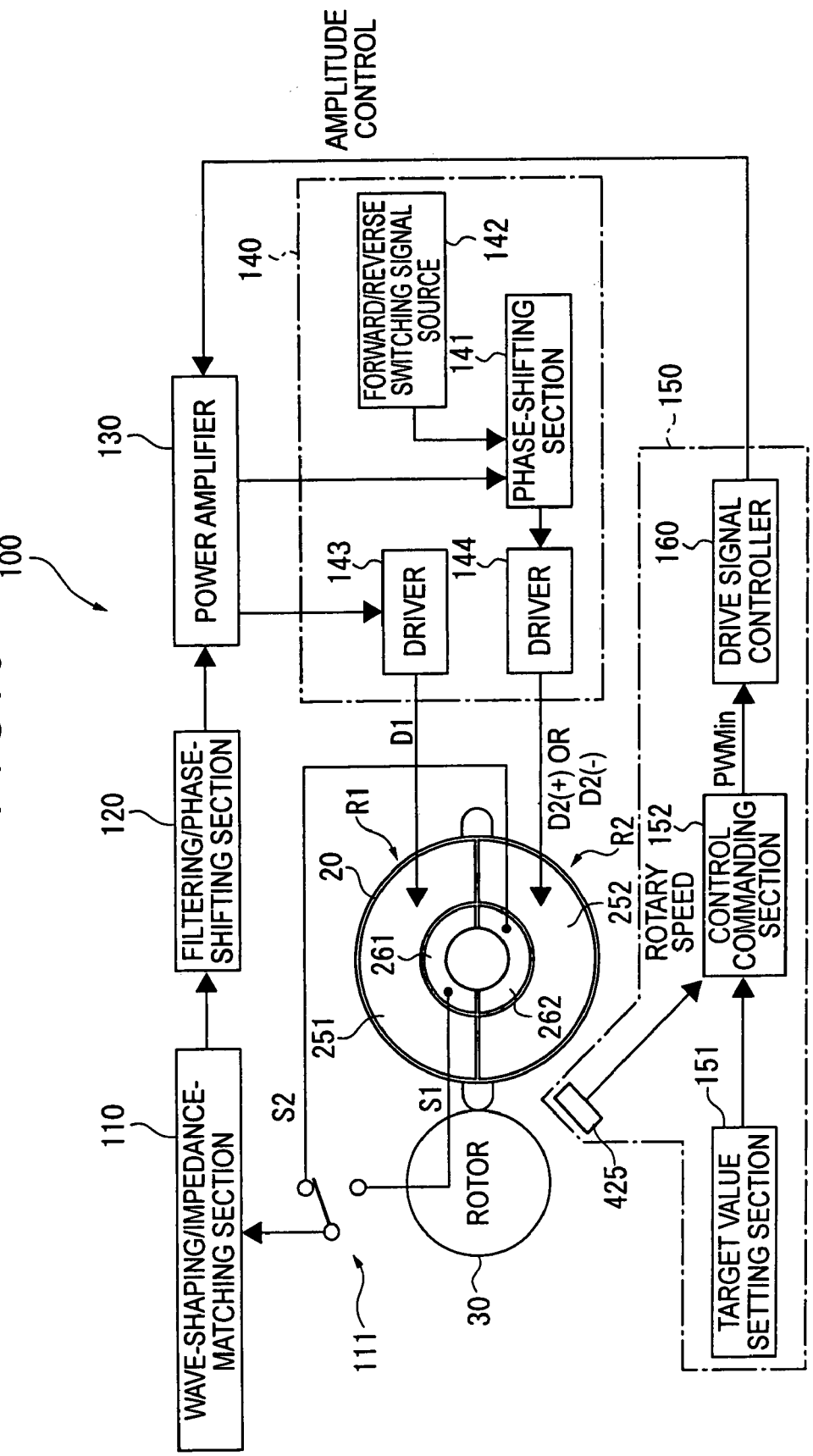
FIG. 6 is a block diagram showing a drive control circuit of the piezoelectric actuator of the exemplary embodiment.

As shown in FIG. 4, the piezoelectric actuator 20 has a ring shape having a hole 20C at the center thereof, which includes a piezoelectric vibrator 20A comprising a reinforcing plate 23 with piezoelectric elements 21 and 22 being laminated on both sides thereof and a circuit board (not shown) installed with a drive control circuit 100 (FIG. 6).

Figure 5:
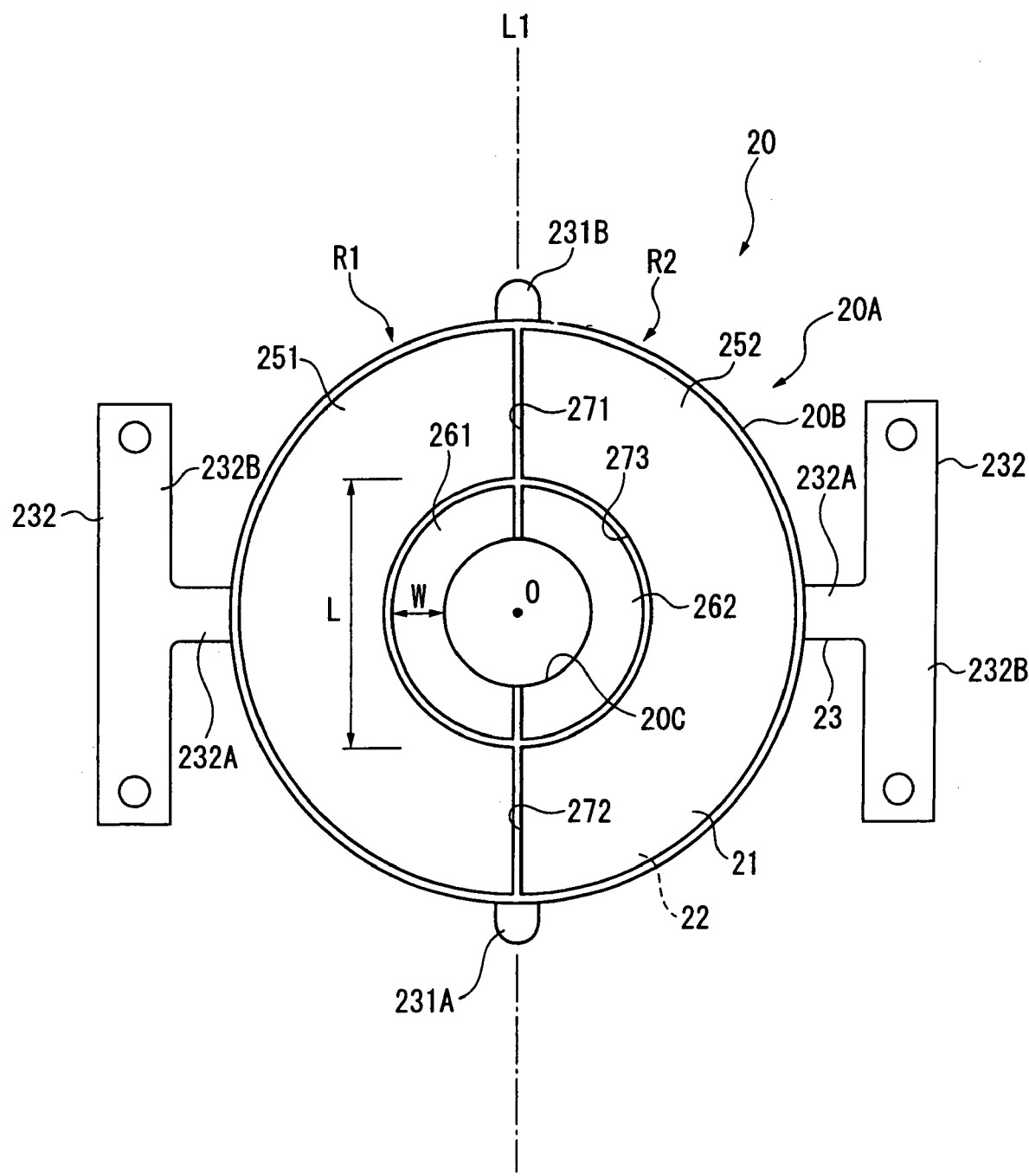
FIG. 5 is a plan view showing the piezoelectric actuator of the exemplary embodiment.

The piezoelectric actuator 20 has an approximately semicircular first vibration area R1 and an approximately semicircular second vibration area R2 to which drive signals having a predetermined phase difference are respectively supplied, the vibration areas stretching on both sides of a bisector L1 (FIG. 5) extending along the diameter of the piezoelectric actuator 20.

The piezoelectric elements 21 and 22 are formed in a ring made of material selected from lead zirconium titanate (PZT [registered trade name]), crystal, lithium niobate, barium titanate, lead titanate, lead metaniobate, polyvinylidene fluoride, zinc lead niobate, scandium lead niobate and the like.

Arc-shaped drive electrode 251 to which the drive signal is supplied and, on the inner side of the drive electrode 251, a detection electrode 261 for detecting the vibrating condition of the piezoelectric vibrator 20A are provided on the first vibration area R1 on the surface of the piezoelectric elements 21 and 22. When the piezoelectric actuator 20 is actuated, the portion provided with the detection electrode 261 is also displaced to generate a charge polarization, so that alternate voltage in accordance with the condition of the displacement (strain) is output by the detection electrode 261 as a vibration signal with the same frequency as the drive signal. The voltage of the vibration signal is approximately ten times greater than the voltage of the drive signal when the piezoelectric actuator 20 is resonated.

On the other hand, a drive electrode 252 and a detection electrode 262 are provided on the second vibration area R2 in an axisymmetric manner with the drive electrode 251 and the detection electrode 261 sandwiching the bisector L1.

The detection electrodes 261 and 262 respectively provided on both of the first and the second vibration areas R1 and R2 extend along the periphery of the hole 20C in the circumference direction of the piezoelectric elements 21 and 22, where length L along the bisector L1 is longer than width W along the radial direction of the piezoelectric elements 21 and 22.

The drive electrodes 251 and 252 and the detection electrodes 261 and 262 are provided by forming an electrode surface with plating, sputtering, and vacuum evaporation using nickel, gold and the like and the electrode surface is divided by grooves 271 to 273 formed by etching and the like. Specifically, the first vibration area R1 and the second vibration area R2 are separated by the grooves 271 and 272 extending along the bisector L1, the drive electrode 251 and the detection electrode 261, and the drive electrode 252 and the detection electrode 262 are divided by the groove 273 extending along the circumferential direction.

The piezoelectric element 22 opposed to the bottom plate 1A also has the first and the second vibration areas R1 and R2, the first vibration area R1 being provided with the drive electrode 251 and the detection electrode 261 and the second vibration area R2 being provided with the drive electrode 252 and the detection electrode 262. The electrodes on the piezoelectric element 21 and the electrodes on the piezoelectric element 22 are mutually connected by lead wires and the like. For instance, the (back) drive electrode 251 is provided on the backside of the (front) drive electrode 251, which are mutually conducted and are simultaneously expanded and contracted with the same drive signal.

The drive electrodes 251 and 252 and the detection electrodes 261 and 262 are connected to the drive control circuit 100 (FIG. 6) through wirings 280, 281, 282 and 283 wired through the hole 20C. Since the wirings run through the hole 20C, the installation space for the vibrator can be reduced. Further, since the piezoelectric actuator 20 is ring-shaped and thin, indicator may be provided through the hole 20C to achieve a multi-pointer display, which has been difficult.

The reinforcing plate 23 is made of stainless steel and other electrically conductive material, which integrally includes a ring-shaped body 231 to which the piezoelectric elements 21 and 22 are adhered and a pair of supporting/fixing members 232 that are connected to the body 231 to support the body 231 in a vibratable manner. The reinforcing plate 23 is connected to a grounding (GND) electrode common to the drive electrodes 251 and 252 and the detection electrodes 261 and 262.

The body 231 is vibrated by applying voltage on the piezoelectric elements 21 and 22, which forms the vibrating member 20B together with the piezoelectric elements 21 and 22. Projections 231A and 231B projecting along the bisector L1 are respectively formed on both ends of the bisector L1 of the body 231, one of the projection 231A is in contact with a side of the rotor 30. At this time, the projections 231A and 231B are disposed on a normal line of an outer circumference of the rotor 30.

The supporting/fixing member 232 has a fixing portion 232B fixed on the bottom plate 1A by a screw 232C (FIG. 4) and a vibratable portion 232A including a narrow portion 232E provided on the outer circumference of the vibrating member 20B at a position approximately orthogonal to the bisector L1 and a portion 232D that is freely vibrated by a notch 285 provided on the bottom plate 1A. Provision of the vibratable portion 232A reduces transmission of the vibration energy of the vibrating member 20B toward the fixing portion 232B, thereby improving the drive efficiency.

4 Structure and Effect of Drive Control Circuit of Piezoelectric Actuator

FIG. 6 is a block diagram showing a drive control circuit 100 of the piezoelectric actuator 20. The drive control circuit 100 includes, roughly speaking, wave-shaping/impedance-matching section 110, filter/phase-shifting section 120, power-amplifier 130, drive section 140 for supplying drive signal to the piezoelectric actuator 20 and a speed adjuster 150.

The speed adjuster 150 includes a contact piece 425 for detecting the rotation amount of the rotor 30, a target value setting section 151 for setting target rotary speed of the rotor 30, a control commanding section (CPU) 152 for outputting a control signal based on a difference between the rotary speed detected by the contact piece 425 and the target value, and a drive signal controller 160.

The waveform/impedance matching section 110 includes, not specifically shown as a circuit diagram, a gate protection diode, a resistor, a field-effect transistor (FET), a coupling capacitor and the like. One of the detection electrodes 261 and 262 provided on the piezoelectric actuator 20 is connected to an input terminal of the wave-shaping/impedance-matching section 110 through a switch 111. The switch 111 is switched by a control signal from a normal/reverse switching signal source 142.

Incidentally, the detection signal sensed by the detection electrodes 261 and 262 of the piezoelectric actuator 20 has extremely high output impedance. Further, electric potential exceeding a presupposed potential range may be output according to the drive condition. Accordingly, the detection signal is input into the FET through the gate protection diode (not shown). The signal is amplified by the FET to obtain sufficient electric current for transmitting the signal to the filter/phase-shifting section 120 on the downstream. The waveform of the detection signal input into the wave-shaping/impedance-matching section 110 is shown in (B) in FIG. 7 and the waveform of the output signal of the wave-shaping/impedance-matching section 110 is shown in (C) in FIG. 7.

The filter/phase-shifting section 120 includes an integrator circuit for integrating the input signal from the wave-shaping/impedance-matching section 110 to absorb abrupt fluctuation of the detection signal and a highpass filter for removing unnecessary low-frequency component of the detection signal. According to the arrangement, the entirety of the filter/phase-shifting section 120 exhibits band-pass characteristics on account of low-pass characteristics of the integrator.

The waveform of the output signal of the filter/phase-shifting section 120 is shown in (D) in FIG. 7. The filter/phase-shifting section 120 changes the phase of the detection signal shown in (B) in FIG. 7 by a predetermined angle around the resonance frequency of the piezoelectric actuator 20. The predetermined angle is preset as a setting value of the filter/phase-shifting section 120.

The predetermined angle of the phase changed by the filter/phase-shifting section 120 is set to achieve a drive frequency providing the most efficient drive condition in accordance with drive characteristics and required drive condition of the piezoelectric actuator 20. Incidentally, the resonance frequency of the piezoelectric actuator 20 is determined in accordance with the material characteristics and dimension of the piezoelectric elements 21 and 22 and the reinforcing plate 23. For instance, the resonance frequency of the piezoelectric actuator 20 is set as approximately from 108 to 110 kHz.

Incidentally, though approximately maximum drive efficiency can be obtained in resonant state, piezoelectric actuator 20 can be driven at a frequency around the resonance point. However, since the piezoelectric actuator 20 is driven by virtue of resonance, when the drive frequency is greatly deviated from the resonance point, vibration amplitude of the piezoelectric actuator 20 becomes extremely small, so that the rotor 30 can be hardly driven.

In the exemplary embodiment, the shifting amount by the filter/phase-shifting section 120 is set at a predetermined value and is stored in a memory. However, proper shifting amount for driving the rotor may be actually measured in actuating the piezoelectric actuator 20 by, for instance, driving the rotor 30, and the detected shifting amount may be set on the filter/phase-shifting section 120.

The power amplifier 130 includes an operating amplifier, a resistor, a push-pull circuit constituted by FET, an output-side resistor and the like.

The voltage and current of the signal output by the filter/phase-shifting section 120 are amplified by the power amplifier 130 to be output. The output signal is input into the drive electrodes 251 and 252 of the piezoelectric actuator 20 through the drive section 140. The output signal of the operating amplifier is shown in (E) in FIG. 7 and the drive signal of the drive signal controller 160 is shown in (F) in FIG. 7.

The drive section 140 includes a phase-shifting section 141 for changing the phase of the output signal from the power amplifier 130, the normal/reverse switching signal source 142 for switching the direction of the phase-shifting of the phase-shifting section 141, and two drivers 143 and 144 for supplying drive signal as alternating drive voltage toward the piezoelectric actuator 20. The driver 143 is connected to the drive electrode 251 provided on the first vibration area RI of the piezoelectric actuator 20 and the driver 144 is connected to the drive electrode 252 provided on the second vibration area R2 of the piezoelectric actuator 20.

The signal output from the power amplifier 130 is directly input into the driver 143, and the input signal is altered as alternating voltage and supplied to the piezoelectric actuator 20. However, the signal output by the power amplifier 130 is input into the driver 144 through the phase-shifting section 141, where the phase of the signal output by the power amplifier 130 is modified by a predetermined angle.

The phase-shifting amount of the phase-shifting section 141 is 90° in the exemplary embodiment, plus and minus of the phase-shifting amount being switched by a control signal from the normal/reverse switching signal source 142.

The forward/reverse signal switching source 142 inputs a control signal to set the rotary direction of the rotor 30 as normal direction + (FIG. 3) by receiving a command value indicating change of date. On the other hand, the forward/reverse signal switching source 142 inputs a control signal to set the rotary direction of the rotor 30 as reverse direction − (FIG. 3) by receiving a command value representing date correction.

Figure 8A:
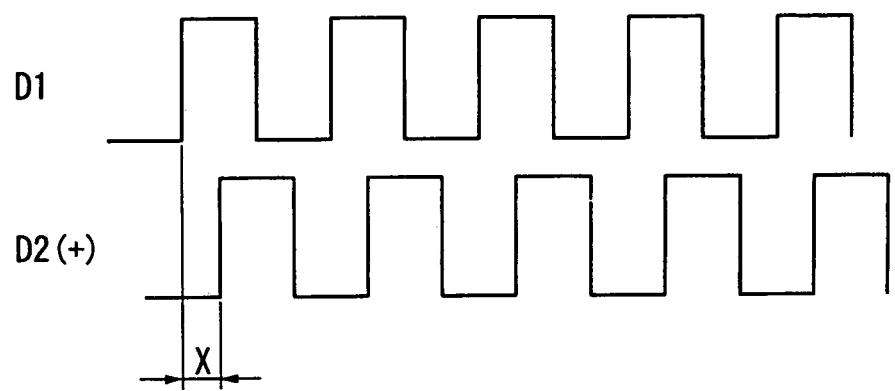
FIGS. 8A and 8B are waveform charts respectively showing phase difference of drive signal of the piezoelectric actuator according to the exemplary embodiment.

FIG. 8A shows signals D1 and D2(+) input into the drivers 143 and 144 when the rotary direction of the rotor 30 is +, where the phase-shifting amount of the phase-shifting section 141 is +90° when the phase of the signal D1 is 0°. At this time, the signal D1 is referenced as a phase-difference advance drive signal and the signal D2(+) is referenced as a phase-difference delay drive signal in relation to the signals D1 and D2(+).

Figure 8B:
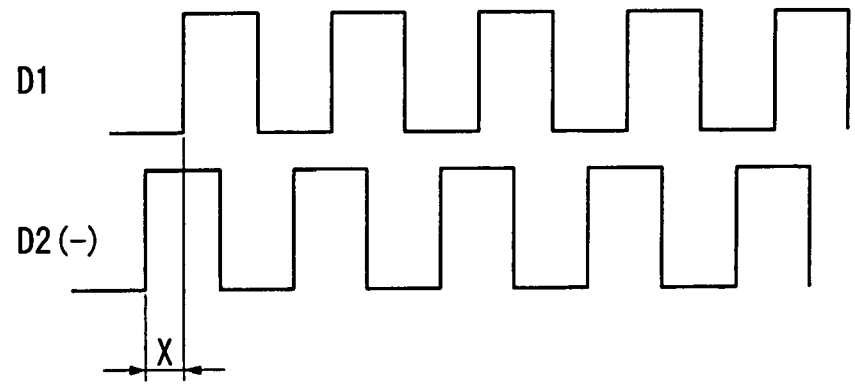

On the other hand, FIG. 8B shows signals D1 and D2(−) input into the drivers 143 and 144 when the rotary direction of the rotor 30 is −, where the phase-shifting amount of the phase-shifting section 141 is −90° when the phase of the signal D1 is 0°. At this time, the signal D1 is referenced as the phase-difference delay drive signal and the signal D2(+) is referenced as the phase-difference advance drive signal in relation to the signals D1 and D2(−).

In other words, drive phase-difference X of +90° or −90° is given between the signals D1 and D2 (+ or −) and the vibrating action of the first and the second vibrating areas R1 and R2 of the piezoelectric actuator 20 to which the signals D1 and D2 are supplied is based on the drive phase-difference X.

Incidentally, the waveforms shown in FIGS. 8A and 8B are based on (F) in FIG. 7, which is more schematically shown.

The normal/reverse switching signal source 142 switches the switch 111 in accordance with the rotary direction of the rotor 30. The switching of the switch 111 leads to connection between the detection electrode 261 of the piezoelectric actuator 20 and the wave-shaping/impedance-matching section 110 when the rotor is rotated in normal direction (+ direction) and connection between the detection electrode 262 of the piezoelectric actuator 20 and the wave-shaping/impedance-matching section 110 when the rotor is rotated in reverse direction (− direction).

Next, the detection signal from the contact piece 425 is fed to the control commanding section 152 of the speed adjuster 150 to detect the rotary speed of the rotor 30. A target value from the target value setting section 151 for setting a target rotary speed of the rotor 30 is also input into the control commanding section 152. The target value set by the target value setting section 151 may be manually set by a user or may be automatically set in accordance with the condition of the device driven by the rotor 30.

The control commanding section 152 compares the target value input by the target value setting section 151 and the current rotary speed input by the contact piece 425 to output a control signal (pulse signal) for eliminating the difference into the drive signal controller 160. The control signal PWMin may be a pulse signal of 3 kHz, the duty ratio of the pulse signal being varied in accordance with the difference between the target value and the actual rotary speed to change the ratio of break-off condition (i.e. the control signal PWMin is at a high level in the exemplary embodiment) and break-on condition (i.e. the control signal PWMin is at a low level in the exemplary embodiment) to control the speed of the piezoelectric actuator 20. Accordingly, the control signal PWMin is a signal for conducting so-called pulse-width control and the speed of the piezoelectric actuator 20 is basically adjusted by the pulse-width control.

The rotary speed of the rotor 30 is detected by the contact piece 425 and is input into the control commanding section 152. The control commanding section 152 compares the target value set by the target value setting section 151 and the rotary speed to output a control signal PWMin. In the exemplary embodiment, as shown in (A) in FIG. 7, the control signal PWMin output by the control commanding section 152 is set as: a low-level signal for braking and restraining the speed of the piezoelectric actuator 20; and as a high-level signal for releasing the braking. Accordingly, the control commanding section 152 controls the duty ratio of the control signal PWMin, so that, in order to reduce the speed of the piezoelectric actuator 20, the ratio of the low-level signal for brake-on control is increased and, for accelerating the piezoelectric actuator 20, the ratio of the high-level signal is increased.

The drive signal controller 160 includes an amplitude-restricting resistor serially connected between FET and negative power supply Vdd, an FET connected in parallel with the amplitude-restricting resistor as a bypass-switch, and a switching circuit for controlling on/off of the FET. The switching circuit is set on and off by the control signal PWMin input by the control commanding section 152.

In the above-described drive controller 100, when the drive signal is supplied into the drive electrodes 251 and 252 of the piezoelectric actuator 20 through the drivers 143 and 144, the vibration signal in accordance with the vibration of the piezoelectric actuator 20 is output by the detection electrodes 261 and 262 and is input into the drive electrode of the piezoelectric actuator 20 through the power amplifier 130 and the drive section 140. When the signal loop satisfies a condition (voltage gain=1 or more), the circuit establishes a positive feedback and oscillation continues at a frequency where the phase difference of the loop is an integral multiple of 360 degrees. In other words, the piezoelectric actuator 20 can generate self-excited oscillation by shifting the phase to resonate the piezoelectric actuator 20 and the phase of the vibration signal is fed back to the drive electrodes 251 and 252 as the drive signal.

The signal loop will be described below with reference to FIG. 7. The detection signal output from one of the detection signals 261 and 262 is amplified and wave-shaped by the wave-shaping/impedance-matching section 110. At this time, noise generated when the control signal PWMin is switched between the high-level and the low-level is also amplified as shown in (B) in FIG. 7.

The signal amplified and wave-shaped by the wave-shaping/impedance-matching section 110 is integrated at the filter/phase-shifting section 120 to remove unnecessary high-frequency component and low-frequency component. Integration of the input signal removes the noise caused during the switching a$ shown in (D) in FIG. 7. Further, the phase of the signal is shifted so that the phase-delay of the loop constituted by the circuits 110, 120 and 130 and the piezoelectric actuator 20 becomes an integral multiple of 360 degrees around the resonance frequency of the piezoelectric actuator 20.

The signal is amplified and shaped by the power amplifier 130 to be approximately rectangular-wave pulse signal shown in (E) in FIG. 7. The push-pull circuit in the power amplifier 130 switches the potential of the output signal between positive potential Vcc and negative potential Vdd in accordance with the pulse signal and amplifies the output electric current. The drive signal is input into the drive electrodes 251 and 252 of the piezoelectric actuator 20.

On the other hand, the speed of the rotor 30 is adjusted as follows:

Initially, the control commanding section 152 outputs the control signal PWMin to the drive signal controller 160 based on the difference between the rotary speed detected by the contact piece 425 and the target value from the target value setting section 151.

In the drive signal controller 160, when the control signal PWMin is a high-level signal, the FET in the drive signal controller 160 is set "on" by the switching circuit. The FET is then directly connected with the negative power supply Vdd and the drive signal from the drive signal controller 160 is fluctuated between the positive potential Vcc and the negative potential Vdd as shown in (F) in FIG. 7.

On the other hand, when the control signal PWMin is a low-level signal, the FET in the drive signal controller 160 is set "off" and the FET is connected to the negative power supply Vdd through the amplitude-restricting resistor. Since the resistance value of the amplitude-restricting resistor is extremely great as compared to the resistor in the power amplifier 130, the output signal (pulse signal) from the power amplifier 130 cannot be lowered to the negative power supply Vdd, which becomes voltage (amplitude) slightly lower than the positive potential. Since the voltage of the drive signal is slightly changed with small displacement (amplitude), the piezoelectric elements 21 and 22 are also slightly expanded and contracted to continue the vibration thereof. In other words, by setting the resistance ratio between the resistor in the power amplifier 130 and the resistor in the drive signal controller 160, the voltage displacement of the drive signal can be minimized to a level where the piezoelectric actuator 20 is not stopped. The piezoelectric actuator 20 continues the vibration thereof and, since the vibration amplitude becomes small, the rotary speed of the rotor 30 is reduced, i.e. braked. Accordingly, both of the speed adjustment and the continuous vibration of the rotor 30 can be achieved.

5 Movement of Piezoelectric Actuator

Next, the movement of the piezoelectric actuator 20 will be described below with reference to FIG. 9. The piezoelectric actuator 20 is actuated at the time of date change or date correction and drive signals D1 and D2(+) having positive phase difference or D1 and D2(-) having negative phase difference are respectively supplied to the first and the second vibration areas R1 and R2 through the drive controller 100 (see FIG. 8). Accordingly, an electric field is generated in thickness direction of the respective piezoelectric elements 21 and 22 and the piezoelectric elements 21 and 22 excites so-called respiratory vibration together with the reinforcing plate 23 as an elastic body, in which the piezoelectric elements 21 and 22 expand and contract in a direction orthogonal to the direction of the electric field, i.e. radial direction of the piezoelectric elements 21 and 22. The anti-node of the respiratory vibration is the entirety of the outer circumference of the vibrating member 20B.

Figure 9:
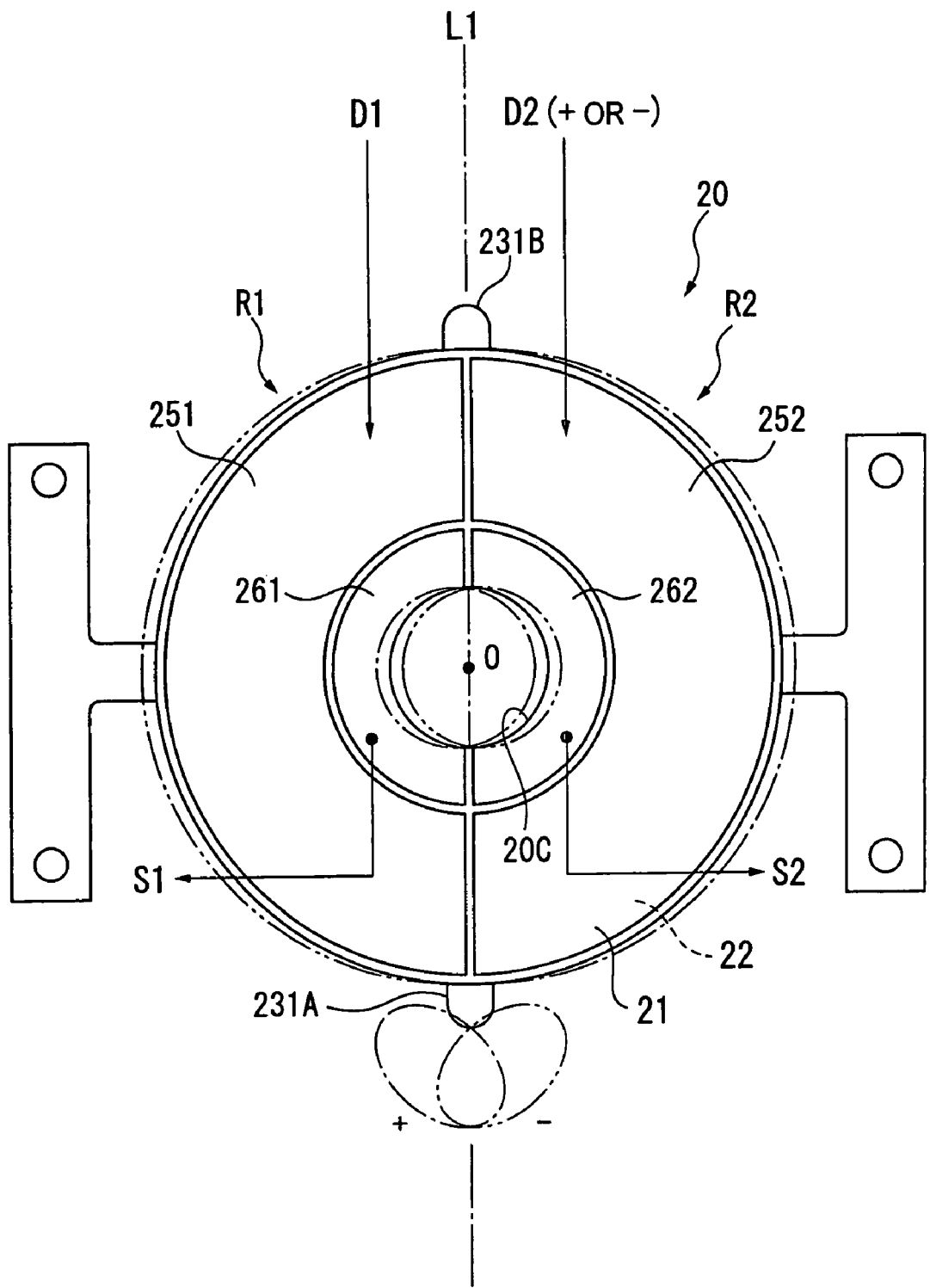
FIG. 9 is a plan view showing an action of the piezoelectric actuator of the exemplary embodiment.

Since there is a certain phase difference between the drive signals D1 and D2 (+ or -), the vibrating action of the first vibration area R1 and the vibrating action of the second vibration area R2 becomes asymmetric as separately shown in dashed line and two-dot dashed line in FIG. 9.

The phase difference of the respiratory vibration between the first and the second vibration areas R1 and R2 causes deviation of the first and the second vibration areas R1 and R2 with respect to the circle center O of the piezoelectric actuator 20. In other words, as shown in FIG. 9, the position of the hole 20C at the center of the piezoelectric actuator 20 reciprocates between both sides of the bisector L1 passing through the circle center O as shown in FIG. 9.

As described above, the piezoelectric actuator 20 is excited in a mixed mode of respiratory vibration and bending vibration and is vibrated in a condition similar to resonance.

When the drive signals D1 and D2(+) bearing positive phase difference is fed to the first and the second vibration area R1 and R2 (specifically, phase-difference advance drive signal D1 is fed to the first vibration areas R1 and phase-difference delay drive signal D2(+) is fed to the second vibration area R2), the vibration locus of the projection 231A traces approximately ellipsoidal locus inclined relative to the bisector L1 as shown in + in FIG. 9. The rotor 30 is intermittently driven in a direction in which the rotor is in contact with the vibration locus. The rotor 30 is rotated at a predetermined speed in + direction (FIG. 3) by the continuous ellipsoidal movement of the projection 231A at a predetermined drive frequency, which rotates the date dial 50 to change the displayed date.

On the contrary, when the drive signals D1 and D2(-) bearing negative phase difference is fed to the first and the second vibration areas R1 and R2 (specifically, phase-difference delay drive signal is fed to the first vibration area R1 and phase-difference advance drive signal is fed to the second vibration area R2), the vibration locus of the projection 231A traces approximately ellipsoidal locus shown as – in FIG. 9 having inclination different from the +locus relative to the bisector L1. The locus shown as – and the above-described locus shown as + are approximately axisymmetric with respect to the bisector L1 and are reversely rotated. Accordingly, the rotor 30 is rotated in the reverse direction – (FIG. 3), which rotates the date dial 50 to correct the displayed date.

Incidentally, in the drive controller 100 as a self-excitation drive circuit, the drive frequency is controlled based on the detected phase difference Y (FIG. 7) between the drive signal input into the piezoelectric actuator 20 and the output vibration signal. In other words, the phase is shifted by the filter/phase-shifting section 120 to obtain a desired drive condition. The resonant point of the piezoelectric actuator 20 fluctuates in accordance with the change in the ambient temperature and heat-generation, and abrasion oh account of friction against the rotor and load fluctuation on account of change in the attitude of the electronic timepiece 1 may also occur. The drive frequency suitable for driving the actuator may change in accordance therewith and there may be inconveniences such as excessive vibration resulting in damage of the actuator or, on the contrary, inability of driving the rotor 30. Accordingly, it is necessary to control the drive frequency at a suitable level, however, the phase difference as an index for the control may preferably be monotonic (linear) increase or decrease considering controllability.

The characteristics of the phase difference with reference to the relationship between the location of the detection electrode for sensing the vibration of the piezoelectric actuator 20 and the rotary direction of the rotor 30 are shown in FIGS. 10 to 13.

Figure 10:
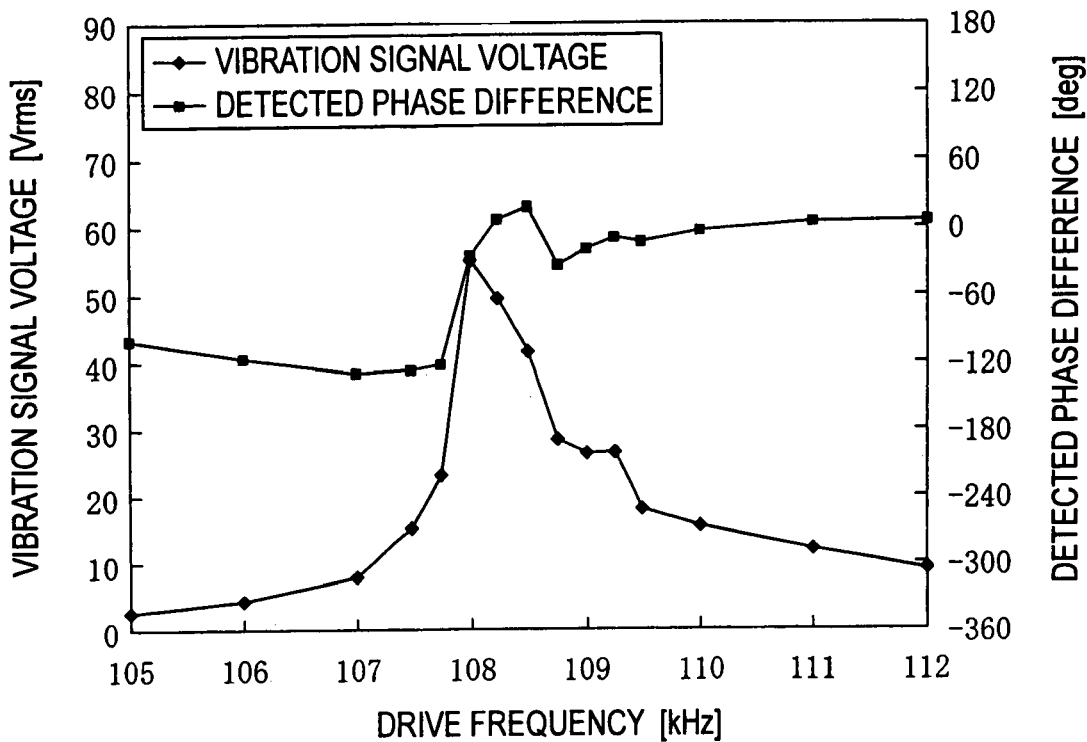
FIG. 10 is a graph showing characteristics of phase difference between drive signal and vibration signal and vibration voltage (data on a first detection electrode provided on an area to which phase-advance drive signal is input during normal rotation)
Figure 11:
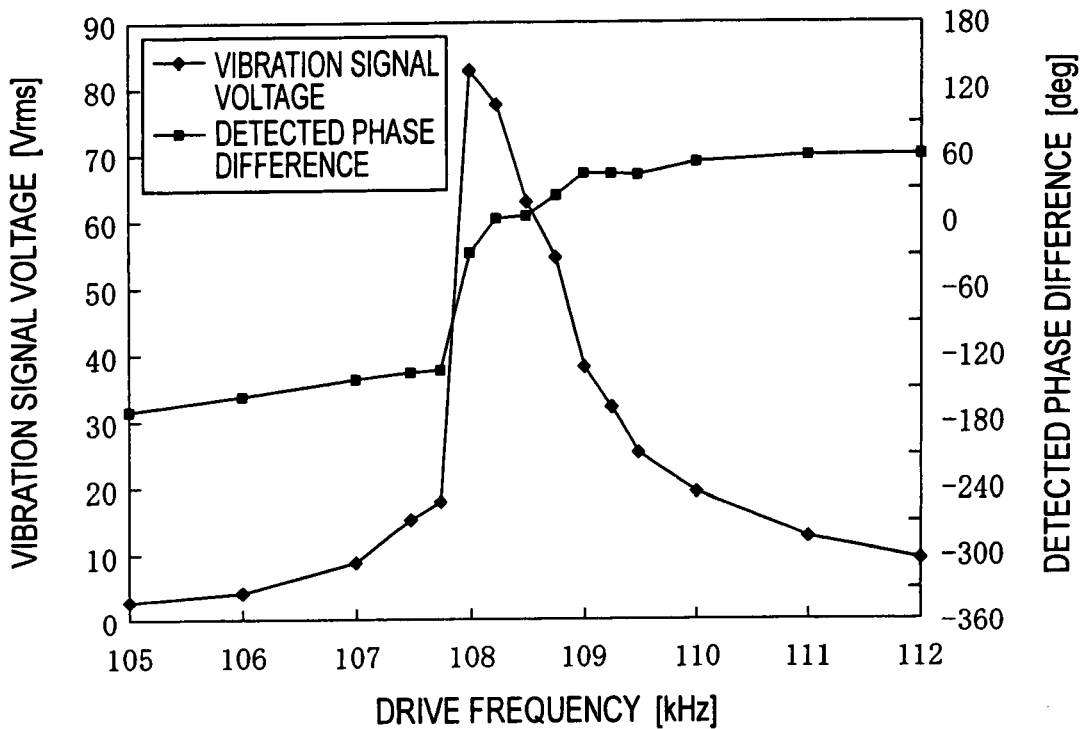
FIG. 11 is a graph showing characteristics of phase difference between drive signal and vibration signal and vibration voltage (data on a second detection electrode provided on an area to which phase-delay drive signal is input during normal rotation)

FIGS. 10 and 11 show the characteristics of the phase difference when the rotor 30 is drive in the normal direction +. Both of the FIGS. 10 and 11 show an arrangement in which the drive signals D1 and D2(+) bearing positive phase difference are input into the first and the second vibration areas R1 and R2, where FIG. 10 shows characteristics when the detection electrode 261 provided on the first vibration area R1 is used and FIG. 11 shows characteristics when the detection electrode 262 provided on the second vibration area R2 is used. When FIGS. 10 and 11 are compared, the characteristics of the phase difference (detected phase difference) between the drive signal D1 and the vibration signal S1 fluctuate within a range of drive frequency exhibiting good drive efficiency (from approximately 108 to 110 kHz) and do not monotonically increase in FIG. 10. On the other hand, the characteristics of the phase difference (detected phase difference) between the drive signal D1 and the vibration signal S2 within the same bandwidth of drive frequency exhibits monotonic increase. Further, higher gain (voltage of the vibration signal) is obtained in FIG. 11 than in FIG. 10. When the detected phase difference exhibits a monotonic increase, since the detected phase difference and the drive frequency can be associated in one-to-one manner, the drive control can be facilitated. Specifically, the value may not be stored as a table and it is not necessary to provide a complicated algorithm for neglecting error value within a predetermined range to avoid abnormal operation when there is reversed value in the detected phase difference and two or more target phase difference frequencies are found.

Figure 12:
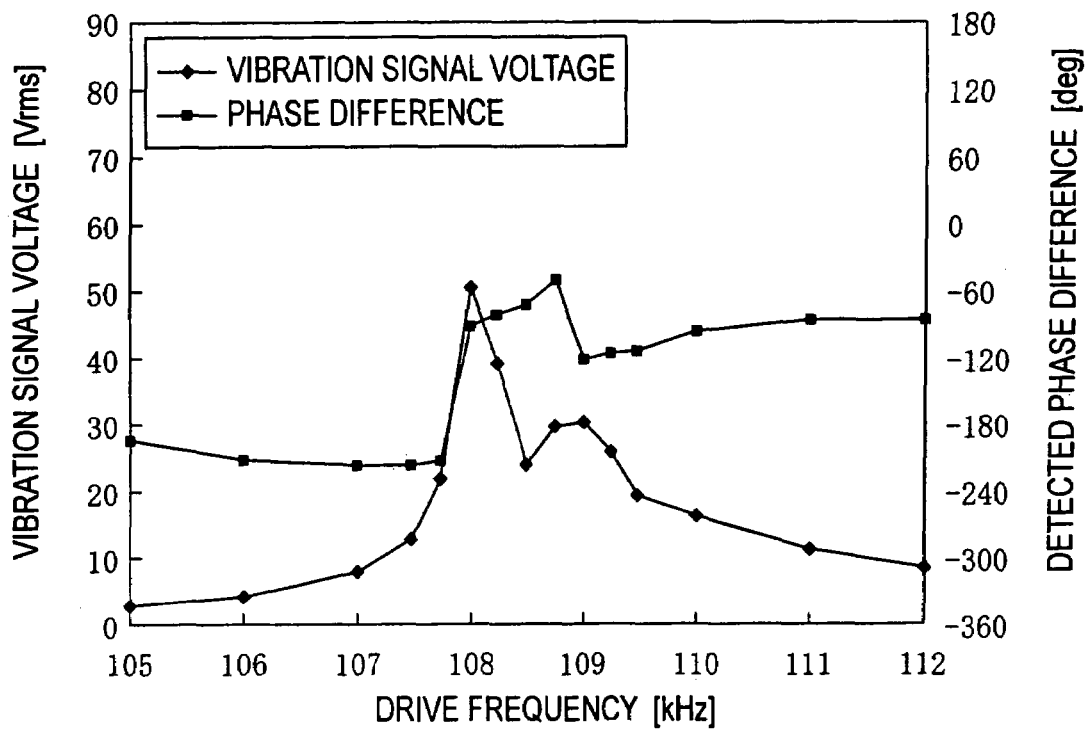
FIG. 12 is a graph showing characteristics of phase difference between drive signal and vibration signal and vibration voltage (data on the second detection electrode provided on an area to which phase-advance drive signal is input during reverse rotation)
Figure 13:
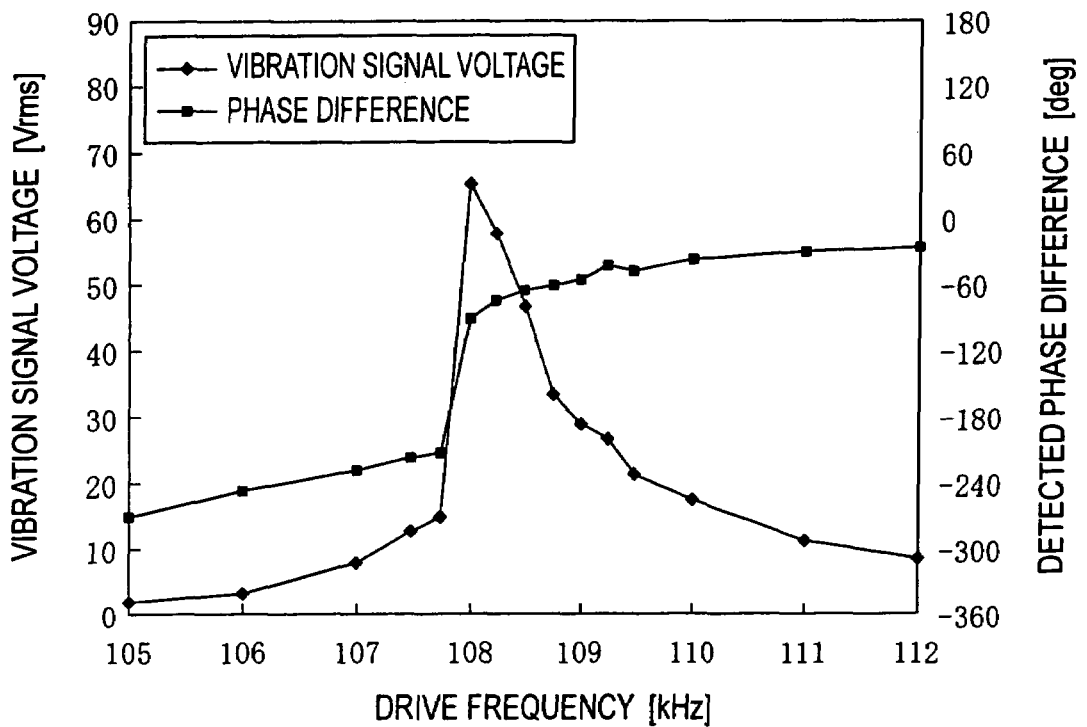
FIG. 13 is a graph showing characteristics of phase difference between drive signal and vibration signal and vibration voltage (data on a first detection electrode provided on an area to which phase-delay drive signal is input during reverse rotation)

On the other hand, FIGS. 12 and 13 show phase difference when the rotor 30 is driven in the reverse direction −. In both of FIGS. 12 and 13, the drive signals D1 and D2(−) having negative phase difference are input into the first and the second vibration areas R1 and R2, where FIG. 12 shows phase difference characteristics and voltage of the vibration signal S1 when the detection electrode 261 provided on the first vibration area R1 is used and FIG. 13 shows phase difference characteristics and voltage of the vibration signal S2 when the detection electrode 262 provided on the second vibration area R2 is used. When FIGS. 12 and 13 are compared, the characteristics of the phase difference (detected phase difference) between the drive signal D1 and the vibration signal S2 shows monotonic increase within a range of drive frequency exhibiting good drive efficiency (from approximately 108 to 110 kHz) in FIG. 12. On the other hand, the characteristics of the phase difference (detected phase difference) between the drive signal D1 and the vibration signal S1 fluctuate within the same range and do not exhibit monotonic increase. Further, higher gain (voltage of the vibration signal) is obtained in FIG. 12 than in FIG. 13.

It is considered that one of the reason why the phase and voltage of the vibration signals S1 and S2 of the detection electrodes 261 and 262 are not the same is that there is the phase difference between the drive signals (D1 and D2(+), or D1 and D2(−)) supplied to the drive electrodes 251 and 252 adjacent to the detection electrodes 261 and 262.

FIGS. 10 to 13 show that the detected phase difference shows monotonic increase and high voltage level of the vibration signal when the detection electrode (261 or 262) provided on the area (the first vibration area R1 or the second vibration area R2) to which phase-delayed drive signal is fed is used.

Accordingly, the switch 111 in the above-described drive controller 100 is switched in accordance with normal/reverse operation of the rotor, so that one of the detection electrodes 261 and 262 is used for detecting the vibration.

Incidentally, the detected phase difference suitable for driving the rotor 30 differs between normal rotation and reverse rotation of the rotor 30 in accordance with pressurizing condition of the rotor 30, material properties, dimension and shape of the piezoelectric elements 21 and 22 and the like. Accordingly, the phase-shifting amount is set on the filter/phase-shifting section 120 respectively for each normal rotation and reverse rotation of the rotor 30. In the example shown in FIGS. 10 to 13, the detected phase difference for achieving the drive frequency suitable for driving the rotor is approximately from −60° to +60° in normal rotation and approximately from −90° to −30° in reverse rotation. The phase-shifting amount of the filter/phase-shifting section 120 is set within the range.

6 Effects of Exemplary Embodiment

According to the above-described exemplary embodiment, following advantages can be obtained.

(1) Since the two-phase drive signals D1 and D2 (+ or −) having a predetermined phase difference are respectively input to the first vibration area R1 and the second vibration area R2 and the vibrating condition of the piezoelectric actuator 20 as a drive member of the date display device 10 is detected by the detection electrode (261 or 262) provided on one of the first vibration area R1 and the second vibration area R2 to which at least the phase-delay drive signal is supplied, the phase difference (detected phase difference) between the vibration signal detected by the detection electrode and the drive signal D1 exhibits monotonic increase, which can be used as a setting parameter for controlling the drive of the actuator. Accordingly, complicated algorithm and large-scale circuit are not required, and the frequency of the drive signals D1 and D2 can be easily controlled. Since the frequency of the drive signals D1 and D2 are controlled, deviation of the resonance on account of temporal change can be corrected, thereby achieving stable drive of the actuator.

Further, since the frequency of the drive signals D1 and D2 can be defined solely by the detected phase difference between the vibration signal S1 or S2 and the drive signal D1, the structure of the drive circuit can be simplified, thereby achieving cost reduction and improvement in reliability.

(2) In the piezoelectric actuator 20 having normal rotation mode and reverse rotation mode of the rotor 30, since the detection electrodes 261 and 262 are provided on both of the first vibration area R1 and the second vibration area R2 in axisymmetric manner with respect to the bisector L1, irrespective of asymmetric arrangement of strain distribution on account of the presence of the phase difference of the drive signal (drive phase difference), the strain can be similarly detected in both of the normal rotation mode and the reverse rotation mode. Accordingly, the frequency of the drive signal can be controlled based on the detected phase difference, where the drive performance during the normal rotation and reverse rotation can be made substantially equal or differentiated in a predetermined manner.

(3) Since the detection electrode 261 and the detection electrode 262 are disposed along the circumferential direction of the piezoelectric elements 21 and 22, not only the respiratory vibration mode expanding and contracting in radial direction but also eccentric mode on account of the phase difference of the respiratory vibration can be detected by the respective detection electrodes 261 and 262 as passive strain at the portion where the detection electrodes 261 and 262 are provided. Both of the vibration of respiratory vibration and eccentricity can be detected, based on which the frequency of the drive signals D1 and D2 can be properly controlled. Further, since the strain on account of the eccentricity in addition to the strain generated by the respiratory vibration is generated on the portion on which the detection electrodes 261 and 262 are provided, the voltage of the vibration signals S1 and S2 can be set large, so that the vibration can be clearly detected.

(4) Since the width W of the piezoelectric elements 21 and 22 are smaller than the length L, the smaller displacement on account of eccentricity than that of the respiratory vibration can be detected at the portion of the piezoelectric elements 21 and 22 on which the detection electrodes 261 and 262 are provided, so that drive control in accordance with detected phase difference can be properly conducted.

(5) The detection electrodes 261 and 262 are disposed on the inner side of the piezoelectric elements 21 and 22 and the drive electrodes 251 and 252 are disposed on the outer circumference of the ring-shaped piezoelectric actuator 20 as the anti-node of vibration to allow active displacement of the portion on which the drive electrodes 251 and 252 are provided. Accordingly, deterioration of output on account of provision of the detection electrodes can be avoided. Further, when the detection electrodes 261 and 262 are provided on the outer circumference side, the detection electrodes 261 and 262 requires larger area than an arrangement where the detection electrodes are disposed on the inner circumference and the area of the drive electrodes 251 and 252 are reduced correspondingly, which is not beneficial in terms of output. However, since the detection electrodes 261 and 262 are provided on the inner circumference of the piezoelectric elements 21 and 22, such disadvantages can be avoided.

(6) Since the respective supporting/fixing members 23 are provided on the outer circumference of the vibrating member 20B at a position substantially orthogonal to the bisector L1, the vibrating member 20B is supported approximately at the circumferential center of the respective vibration areas R1 and R2 and the vibration for each of the vibration areas R1 and R2 can be excited in a balanced manner. Accordingly, attenuation of the vibration by supporting the vibrating member 20B can be restrained to the minimum.

Modifications

The scope of the invention is not limited to the above-described exemplary embodiment, and various modifications and improvements are possible as long as an object of the invention can be achieved.

Figure 14:
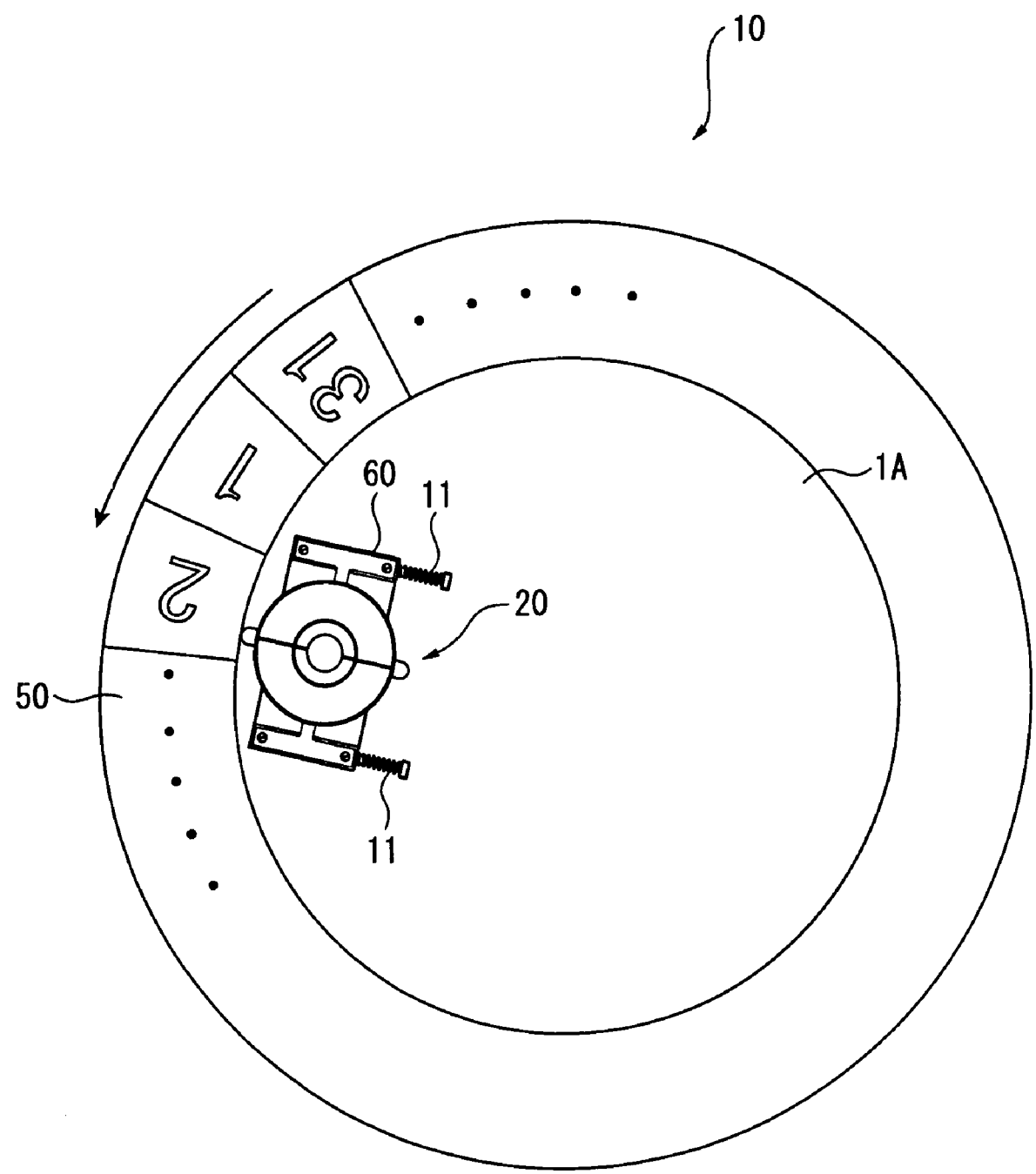
FIG. 14 is an illustration showing an assembly example of piezoelectric actuator according to a modification of the invention.

FIG. 14 shows a different installation arrangement of the above-described piezoelectric actuator 20. As shown therein, the piezoelectric actuator 20 may be directly abutted on the date dial 50 to drive the date dial. Since the piezoelectric actuator 20 includes the ring-shaped piezoelectric elements 21 and 22 and generating great torque, the deceleration gear train 40 (FIG. 2) may not be provided. The piezoelectric actuator 20 is attached on the bottom plate 1A through the slider 60 and is in press-contact with the date dial 50 by virtue of the helical coil spring 11 provided on the bottom plate 1A.

Figure 15:
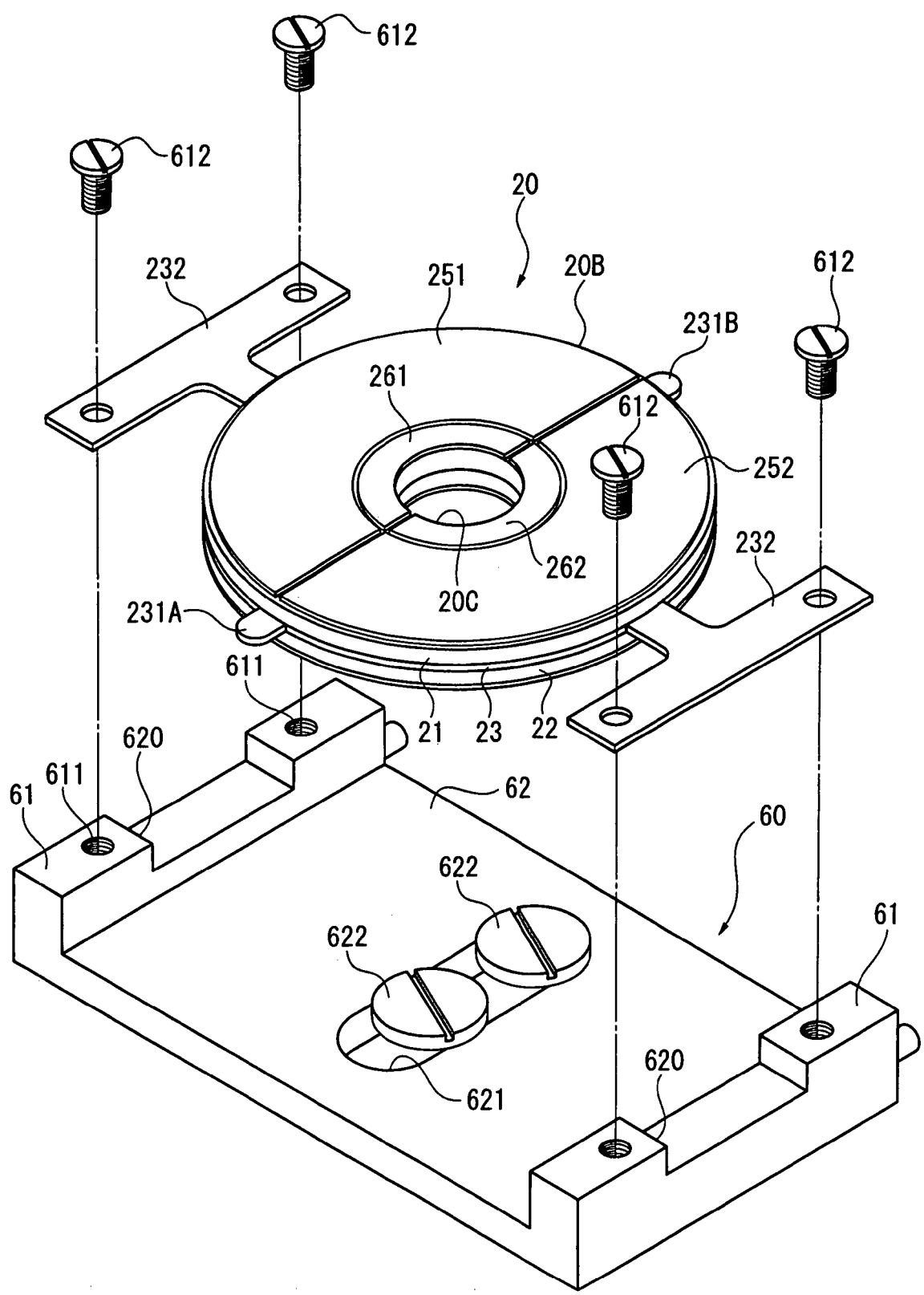
FIG. 15 is an exploded perspective view showing the piezoelectric actuator of the modification.

FIG. 15 is an exploded perspective view showing attachment arrangement of the piezoelectric actuator 20.

The slider 60 includes a pair of rising portions 61 on which the respective fixing portions 23 of the piezoelectric vibrator 20 are fixed and a slide section 62 integrally formed between the rising portions 61 and slidably supported by the bottom plate 1A (FIG. 14).

A pair of screw holes 611 are respectively provided on the rising portions 61 and the piezoelectric actuator 20 is fixed on the slider 60 by screwing the screw 612 into the screw holes 611 through the supporting/fixing portion 23. A notch 620 is provided between the screw holes 611 of the rising portion 61, and a portion of the supporting/fixing portion 232 of the piezoelectric actuator 20 is opposed to the notch 620.

Incidentally, a gap is provided between the piezoelectric actuator 20 and the slide section 62 to avoid interference between the vibrating member 20B and the screw 622 during vibration.

The slide section 62 is disposed along a groove (not shown) formed on the bottom plate 1A (FIG. 14) and has an elongated hole 621 oriented along a direction intersectional to the direction connecting the rising portions 61. The screws 622 are respectively inserted into the elongated hole 621 to be screwed into the bottom plate 1A. Accordingly, the piezoelectric vibrator 20 is mounted on the bottom plate 1A in a manner slidable by the slider 60.

Figure 16:
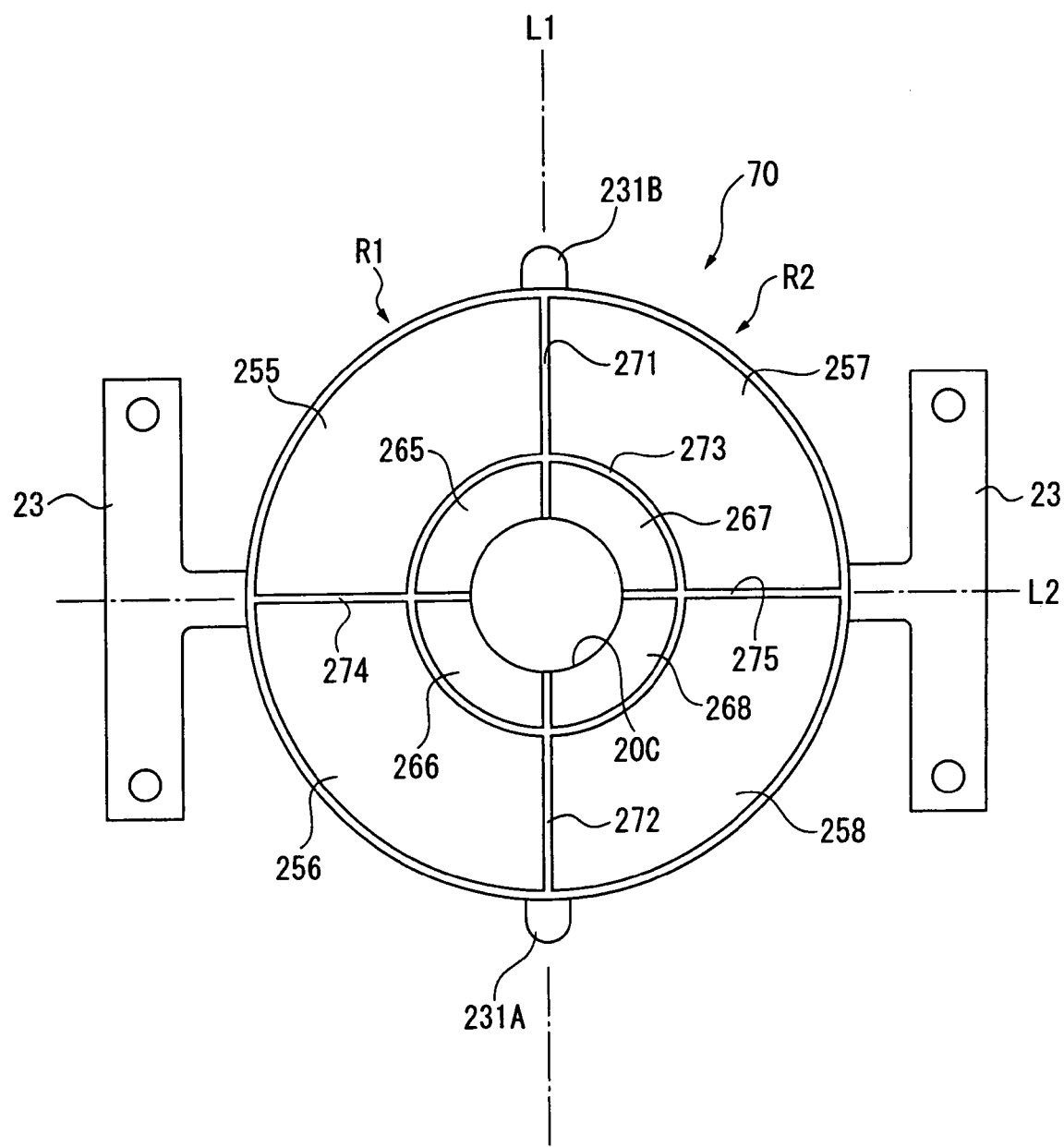
FIG. 16 is a plan view showing a piezoelectric actuator according to another modification of the invention.

FIG. 16 shows another piezoelectric actuator having electrode-dividing arrangement different from that of the exemplary embodiment. The piezoelectric actuator 70 has, similar to the piezoelectric actuator 20, semicircular first and second vibration areas R1 and R2. However, the respective electrodes provided on the piezoelectric elements 21 and 22 are bisected by grooves 274 and 275 provided on a line L2 orthogonal to the bisector L1. Specifically, two drive electrodes 255 and 256 and two detection electrodes 265 and 266 are provided on the first vibration area R1 and two drive electrodes 257 and 258 and two detection electrodes 267 and 268 are provided on the first vibration area R2. As in FIG. 16, more than one drive electrode and detection electrode may be provided on the respective areas R1 and R2. For instance, the detection electrodes 265 and 267 may be used in accordance with normal/reverse movement of the rotor 30 in order to prevent noise in detecting the vibration. Alternatively, averaging the output of the detection electrodes 265 and 266 and detection electrodes 267 and 268 for each or the first and the second vibration areas R1 and R2 is possible to improve vibration-detection accuracy. Further alternatively, the detection electrodes 265 and 268 or the detection electrodes 266 and 267 point-symmetrically arranged with respect to the circle center O may be used in accordance with normal and reverse rotation of the rotor 30. Though the detection electrodes 265, 266, 267 and 268 are provided along the periphery of the hole 20C, other electrode and gap may be interposed between the hole 20C and the detection electrode as long as the detection electrode is aligned with the circumferential direction of the piezoelectric element. In such arrangement, the area of the drive electrodes 255, 256, 257 and 258 is reduced, however, deviation in detection voltage on account of manufacture and assembly process can be reduced when the contacting condition between the wiring passing through the inner hole and the vibration areas R1 and R2 varies or the piezoelectric element is chipped on the periphery of the hole 20C, thereby improving reliability thereof.

Incidentally, though triple-layered structure having a reinforcing plate with piezoelectric elements being respectively adhered on both sides is used in the above-described exemplary embodiment and modification, only one piezoelectric element may be attached on one side of the reinforcing plate or, alternatively, two to ten (or more) pieces of piezoelectric elements may be adhered on both sides of the reinforcing plate to provide a multi-layered structure, thereby increasing drive power of the vibrator.

Though the piezoelectric actuator using the piezoelectric vibrator is installed in a wristwatch, the invention may be applied on a pocket watch, a stand clock, a wall clock and the like. The invention may also be applied on a mechanism for moving a wind-up doll and the like of the various types of watches as well as a mechanism for driving time and calendar display device.

The invention may be installed on various electronics other than electronic timepiece such as a camera, a printer, and movable toys. Specifically, the piezoelectric actuator of the invention may be used for zooming mechanism, auto-focusing mechanism, diaphragm adjusting mechanism and film advance system of a camera, paper-feeding mechanism and ink-jet head of a printer, drive mechanism and attitude correcting mechanism of movable toys, a spindle motor of hard-disk drive and CD drive, a linear motor for moving head assembly, an ultrasonic motor and the like.

Further, the drive control device according to the invention may be used for a drive mechanism of meter pointer of a measuring instrument, a drive mechanism of meter pointer of an instrumental panel of an automobile, a piezoelectric buzzer, ultrasonic motor and the like. Alternatively, the piezoelectric vibrator of the invention may be employed not solely as a piezoelectric actuator but as an oscillator installed on an electronics circuit board.

The object to be driven may be a rotor that is rotated and a linear drive body that is linearly driven and the object may be driven in any direction.

Specific description of best mode for carrying out the invention has been provided in the above, however, the scope of the invention is not limited to the above description. In other words, though the invention has been illustrated and explained with reference to specific embodiment, various modifications and improvements to the above-described embodiment are possible by those skilled in the art with regard to shape, material, number and other details without deviating from technical idea and object of the invention.

The above descriptions regarding shape and material are only examples for enhancing understanding of the invention and are not for restricting the invention. The scope of the invention includes a component having references without a part of or entirety of the shape and material limitation.

What is claimed is:

1. A piezoelectric actuator, comprising: a ring-shaped piezoelectric element, vibration of the piezoelectric element being transmitted to an object;
  a first vibration area and a second vibration area provided on both sides of a bisector bisecting the piezoelectric element along a diameter of the piezoelectric element, the first vibration area and the second vibration area being respectively provided with at least one drive electrode to which a drive signal is supplied, the drive electrode being arranged substantially axisymmetrically with respect to the bisector, the drive signal including a phase-advance drive signal and a phase-delay drive signal having a predetermined phase difference, the phase-advance drive signal that is phase-advanced relative to the phase-delay drive signal being supplied to one of the first vibration area and the second vibration area and the phase-delay drive signal that is phase-delayed relative to the phase-advance drive signal being supplied to the other of the first vibration area and the second vibration area; and
  a detection electrode that detects vibrating condition of the piezoelectric element to output a vibration signal, the detection electrode being provided on at least one of the first vibration area and the second vibration area to which the phase-delay drive signal is supplied,
  the drive of the piezoelectric actuator being controlled based on a detected phase difference between one of the phase-advance drive signal and the phase-delay drive signal and the vibration signal.

2. The piezoelectric actuator according to claim 1,
  wherein plus and minus of the drive phase difference is switchably arranged, and
  wherein the detection electrode is provided on both of the first vibration area and the second vibration area substantially axisymmetrically with respect to the bisector or substantially point-symmetrically with respect to the circle center of the piezoelectric element.

3. The piezoelectric actuator according to claim 1,
  wherein the detection electrode is formed in a shape extending along a circumference of the piezoelectric element.

4. The piezoelectric actuator according to claim 1,
  wherein the detection electrode is disposed along a periphery of a hole provided substantially at the center of the piezoelectric element.

5. The piezoelectric actuator according to claim 1,
  further comprising: a ring-shaped vibrating member having the piezoelectric element; and
  a pair of supporting members connected to the vibrating member, the pair of supporting members supporting the vibrating member in a vibratable manner,
  the supporting members being provided on an outer circumference of the vibrating member at a position substantially orthogonal to the bisector.

6. A drive control method of a piezoelectric actuator, the piezoelectric actuator including: a ring-shaped piezoelectric element; a first vibration area and a second vibration area provided on both sides of a bisector bisecting the piezoelectric element along a diameter of the piezoelectric element, the first vibration area and the second vibration area being respectively provided with at least one drive electrode to which a drive signal is supplied at a position substantially axisymmetric with respect to the bisector; and a detection electrode that detects vibrating condition of the piezoelectric element to output a vibration signal, the detection electrode being provided on at least one of the first vibration area and the second vibration area, the method comprising:
  providing the drive signal with a phase-advance drive signal and a phase-delay drive signal having a predetermined phase difference, the phase-advance drive signal that is phase-advanced relative to the phase-delay drive signal being supplied to one of the first vibration area and the second vibration area and the phase-delay drive signal that is phase-delayed relative to the phase-advance drive signal being supplied to the other of the first vibration area and the second vibration area; and variably controlling the frequency of the drive signal based on a detected phase difference between one of the phase-advance drive signal and the phase-delay drive signal and the vibration signal.

7. The drive control method of a piezoelectric actuator according to claim 6,
wherein plus and minus of the drive phase difference are switchably arranged, and
wherein the detection electrode is provided on both of the first vibration area and the second vibration area substantially axisymmetrically with respect to the bisector or substantially point-symmetrically with respect to the circle center of the piezoelectric element, and
wherein the detection electrode provided on one of the first vibration area and the second vibration area to which the phase-delay drive signal is supplied is used in accordance with switching of the plus and minus of the drive phase difference.

8. An electronic device, comprising a piezoelectric actuator, the piezoelectric actuator including: a ring-shaped piezoelectric element, vibration of the piezoelectric element being transmitted to an object;
a first vibration area and a second vibration area provided on both sides of a bisector bisecting the piezoelectric element along a diameter of the piezoelectric element, the first vibration area and the second vibration area being respectively provided with at least one drive electrode to which a drive signal is supplied, the drive electrode being arranged substantially axisymmetrically with respect to the bisector,
the drive signal including a phase-advance drive signal and a phase-delay drive signal having a predetermined phase difference, the phase-advance drive signal that is phase-advanced relative to the phase-delay drive signal being supplied to one of the first vibration area and the second vibration area and the phase-delay drive signal that is phase-delayed relative to the phase-advance drive signal being supplied to the other of the first vibration area and the second vibration area; and
a detection electrode that detects vibrating condition of the piezoelectric element to output a vibration signal, the detection electrode being provided on at least one of the first vibration area and the second vibration area to which the phase-delay drive signal is supplied,
the drive of the piezoelectric actuator being controlled based on a detected phase difference between one of the phase-advance drive signal and the phase-delay drive signal and the vibration signal.

9. The electronic device according to claim 8, wherein the electronic device is a timepiece including a timer and a time information display that displays information clocked by the timer.

* * * * *